(12) United States Patent
Enomoto et al.

(10) Patent No.: US 6,849,808 B2
(45) Date of Patent: Feb. 1, 2005

(54) WEIGHT SENSOR DEVICE

(75) Inventors: Takayuki Enomoto, Tokyo (JP);
Takayuki Morikawa, Tokyo (JP);
Katsutoshi Sasaki, Tokyo (JP);
Hiroyuki Yamazaki, Tokyo (JP);
Takashi Takeshita, Kanagawa (JP);
Hiroshi Matsunaga, Kanagawa (JP)

(73) Assignees: The Furukawa Electric Co., Ltd., Tokyo (JP); NHK Spring Co., Ltd., Kanagawa (JP)

( * ) Notice: Subject to any disclaimer, the term of this patent is extended or adjusted under 35 U.S.C. 154(b) by 93 days.

(21) Appl. No.: 10/209,307

(22) Filed: Jul. 29, 2002

(65) Prior Publication Data

US 2003/0024747 A1 Feb. 6, 2003

(30) Foreign Application Priority Data

| Jul. 31, 2001 | (JP) | 2001-232823 |
| Oct. 1, 2001 | (JP) | 2001-305205 |
| Jan. 16, 2002 | (JP) | 2002-007624 |
| May 16, 2002 | (JP) | 2002-141995 |
| May 16, 2002 | (JP) | 2002-141996 |
| Jul. 4, 2002 | (JP) | 2002-196498 |

(51) Int. Cl.[7] ............................................. B60R 21/32
(52) U.S. Cl. ..................... 177/144; 180/273; 280/735
(58) Field of Search ............................... 177/136, 137, 177/144, 210 R; 180/273, 283; 280/735

(56) References Cited

U.S. PATENT DOCUMENTS

| 3,109,505 A | * | 11/1963 | Davis et al. ............... 177/137 |
| 3,594,686 A | * | 7/1971 | Fujii et al. ..................... 338/89 |
| 3,675,179 A | * | 7/1972 | Tsukamoto et al. ......... 338/190 |
| 5,573,269 A | * | 11/1996 | Gentry et al. ............... 280/735 |
| 5,777,223 A | * | 7/1998 | Kohrt ......................... 73/432.1 |
| 5,822,707 A | * | 10/1998 | Breed et al. ................. 701/49 |
| 5,864,295 A | * | 1/1999 | Jarocha ...................... 340/667 |
| 5,963,124 A | | 10/1999 | Buss et al. .................. 338/162 |
| 5,988,676 A | * | 11/1999 | Lotito et al. ................ 280/735 |
| 6,039,344 A | | 3/2000 | Mehney et al. ............. 280/735 |
| 6,092,838 A | * | 7/2000 | Walker ....................... 280/735 |
| 6,244,116 B1 | | 6/2001 | Osmer et al. .......... 73/862.474 |
| 6,661,341 B2 | * | 12/2003 | Masuda et al. ............. 340/562 |

OTHER PUBLICATIONS

"The Electrical Engineering Handbook", Richord C. Dorf, Ed., University of Califorina, Davis; CRC Press, Inc., Boca Raton, Florida; pp. 12–13, Copyright 1993.*

* cited by examiner

Primary Examiner—Randy W. Gibson
(74) Attorney, Agent, or Firm—Knobbe, Martens, Olson & Bear, LLP

(57) ABSTRACT

The present invention provides a weight sensor device for detecting a weight of an occupant seated on a seat having a seat frame and a cushion. The device has a sensing wire displaced downward in the seat frame as the cushion is deformed due to the weight of the occupant when the occupant is seated on the seat and a variable resistor for converting a displacement of the sensing wire into an electric signal indicative of the weight of the occupant.

15 Claims, 28 Drawing Sheets

WEIGHT SENSOR DEVICE

BACKGROUND OF THE INVENTION

1. Field of the Invention

The present invention relates to a weight sensor device used in a seat, for measuring a weight of an occupant seated on the seat in an automobile or the like.

2. Description of the Related Art

A mat type or electrostatic-capacitance type weight sensor device is known which is used to measure a weight of an occupant seated on a seat of an automobile or the like.

The conventional mat type weight sensor device includes a plurality of pressure sensors arranged on a plastic film. Each of the pressure sensors output a signal indicative of electrical resistance corresponding to the applied pressure thereto. The pressure sensors are interposed between a cushion pad made of urethane foam or the like and a facing sheet thereof. In this configuration, the outputs from the pressure sensors are processed by an operation unit mounted in an automobile or the like, to determine a weight of an occupant seated on the seat.

The conventional electrostatic-capacitance type weight sensor device, on the other hand, has two electrodes facing each other. The electrodes are attached to a cushion spring disposed on a seat cushion frame for improving a feeling to ride in. In this configuration, electrostatic capacitance between the electrodes, which changes according to contraction and expansion of the cushion spring, is measured to thereby determine a weight of an occupant seated on the seat.

OBJECT AND SUMMARY OF THE INVENTION

It is an object of the present invention to provide a weight sensor device which can accurately detect a weight of an occupant seated on a seat and also which is easy to attach to a seat frame of the seat and inexpensive to manufacture.

The present invention provides a weight sensor device for detecting a weight of an occupant seated on a seat, the seat having a seat frame and a cushion. The weight sensor device comprises a displacement member displaced downward within the seat frame when the cushion is deformed due to the weight of the occupant seated on the seat, and a converter for converting a displacement of the displacement member into an electric signal.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

First Embodiment

Figure 1:
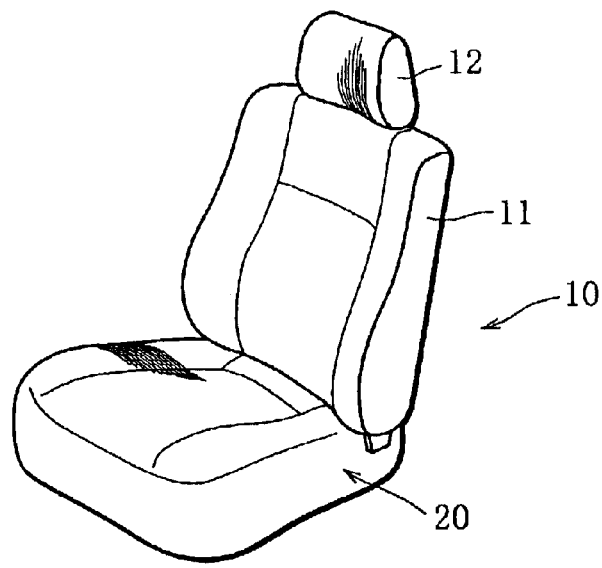
FIG. 1 is a perspective view for showing a seat of an automobile.

FIG. 1 shows a seat 10 of an automobile. The seat 10 includes a seat cushion 20, a seat back 11, and a headrest 12.

Figure 2:
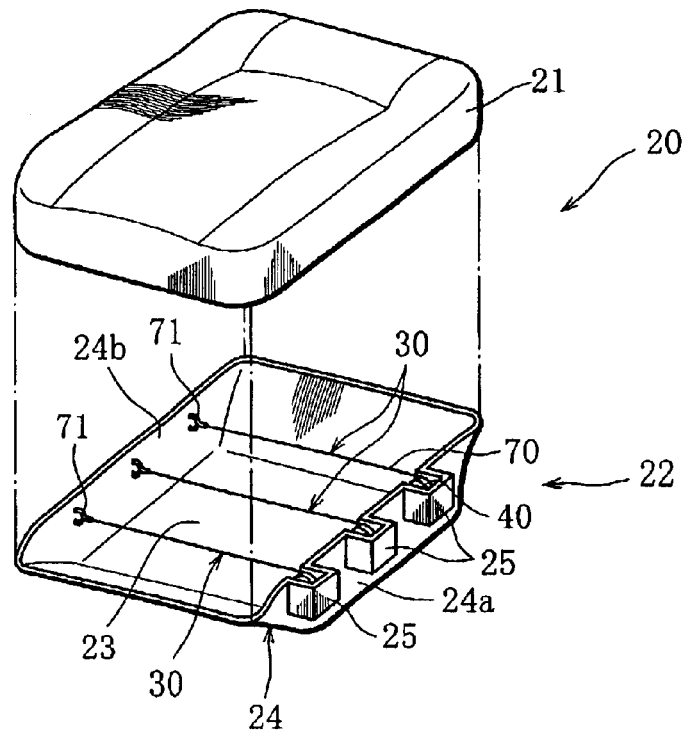
FIG. 2 is a perspective view for showing a seat frame of the seat with a weight sensor device of a first embodiment according to the present invention.

As shown in FIG. 2, the seat cushion 20 has a seat frame 22 and a cushion 21 mounted on the seat frame 22. The seat frame 22 is substantially box-shaped as opened upward, having a bottom wall 23 and a peripheral wall 24. When mounted thereon with the cushion 21, the seat frame 22 cooperates with the cushion 21 to define a bottom chamber therein.

The seat frame 22 is provided with three weight sensors 30, which are arranged in the longitudinal direction of the seat frame 22 with a predetermined spacing therebetween.

The weight sensors 30 are each provided with a sensor unit 40, which is attached to the peripheral wall 24 of the seat frame 22, that is, a side wall 24a thereof. Specifically, a unit holder 25 is integrally formed with the side wall 24a. This unit holder 25 is box-shaped as projected from the side wall 24a, communicating to the bottom chamber.

The sensor unit 40 is housed in the unit holder 25. From the sensor unit 40, a sensing wire 70 extends, to be stretched over between the two side walls 24a and 24b. A hook 71 is provided at one end of the sensing wire 70 and engaged with a pair of engagement holes formed in the side wall 24b.

Figure 3:
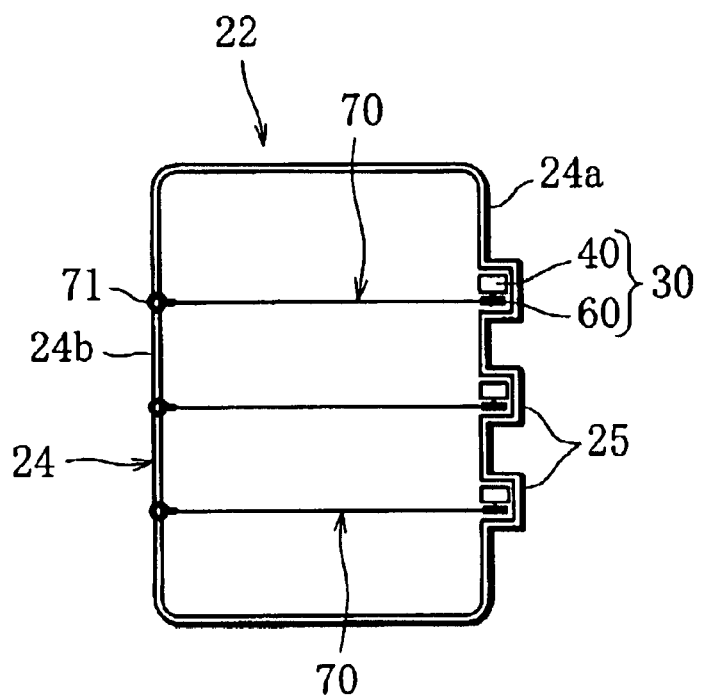
FIG. 3 is a plan view of the seat frame of FIG. 2.
Figure 4:
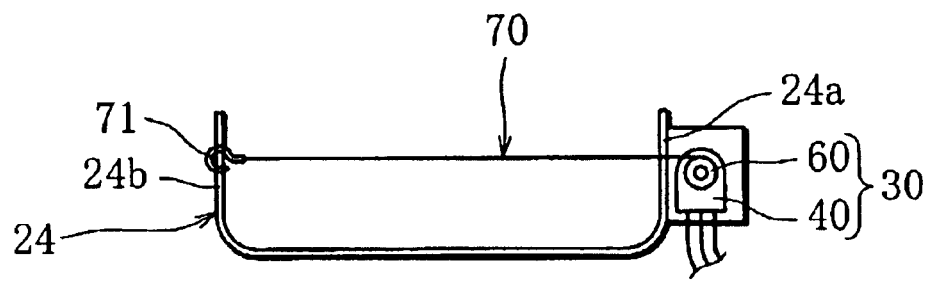
FIG. 4 is a cross-sectional view of seat frame of FIG. 2.

As is clear from FIGS. 3 and 4, the sensing wires 70 of the three weight sensors 30 extend parallel to each other at the same height with respect to the bottom wall 23 of the seat frame 22.

Figure 5:
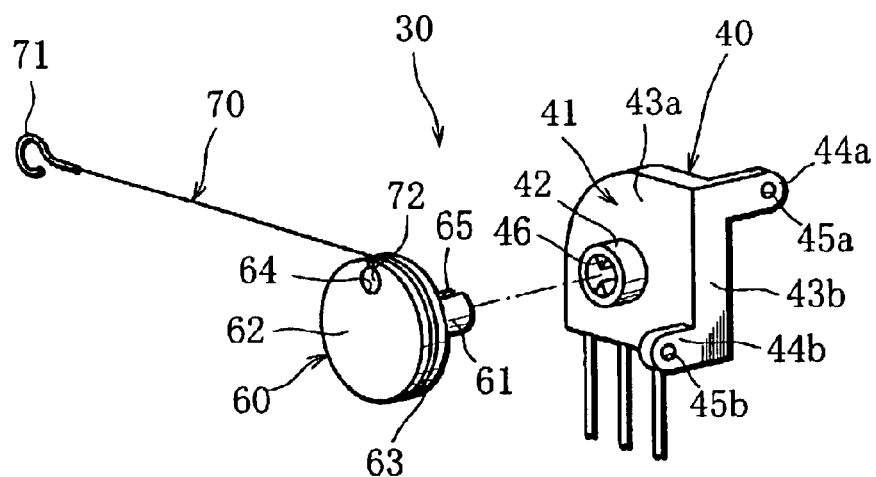
FIG. 5 is an exploded perspective view for showing the weight sensor device of the first embodiment.

As shown in FIG. 5, the sensor unit 40 is provided with a substantially rectangular parallelepiped-shaped case 41. From a front face 43a of the case 41 is projected a rotary shaft 42, which is urged to rotate in one direction by a spiral spring (not shown). The rotary shaft 42 has a hollow shape, on the inner face of which is formed one pair of projections 46 shaped substantially triangular in a cross section. These projections 46 are arranged so that their respective vertexes may face each other toward a central axis of the rotary shaft 42.

A rotary wheel 60 is attached to the rotary shaft 42. The rotary wheel 60 includes a disk 62 having a guide groove 63. The guide groove 63 is formed on an outer peripheral face of the disk 62. The rotary wheel 60 further includes a shaft 61 projecting from one end face of the disk 62. The shaft 61 is inserted into the rotary shaft 42. Specifically, the shaft 61 has one pair of recesses 65 for receiving the projections 46 of the rotary shaft 42 therein, so that the shaft 61 and the rotary shaft 42 can mesh with each other to permit the rotary shaft 42 to rotate integrally with the rotary wheel 60.

The guide groove 63 of the disk 62 can receive the above-mentioned sensing wire 70 therein, so that the sensing wire 70 can be wound around the disk 62.

Figure 6:
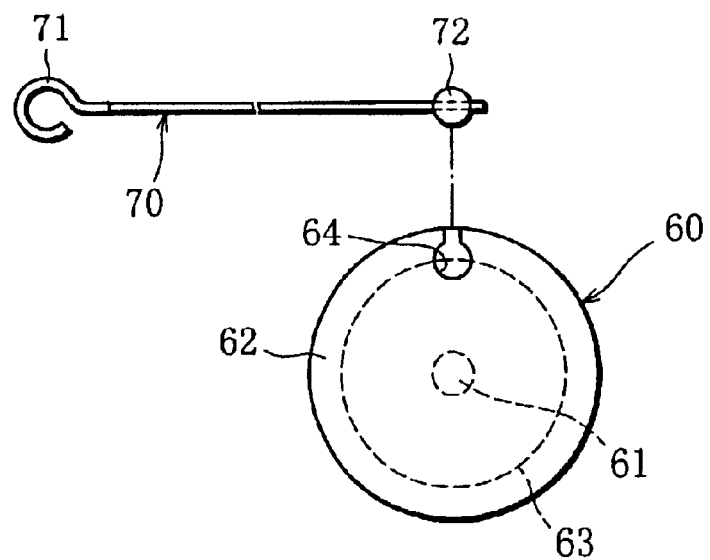
FIG. 6 is a front view for showing a sensing wire and a rotary wheel of FIG. 5.
Figure 7:
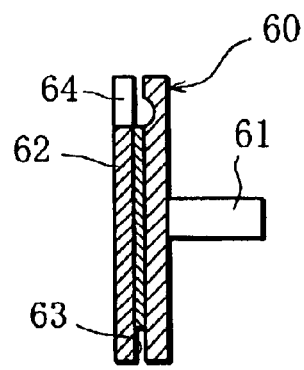
FIG. 7 is a cross-sectional side view for showing the rotary wheel of FIG. 6.

Furthermore, as shown in FIGS. 6 and 7, a notch 64 is formed in an outer periphery portion of the other end face of the disk 62. The notch 64 is key hole-shaped so as to communicate into the guide groove 63.

The other end of the sensing wire 70, on the other hand, has a ball 72. The ball 72 is fitted into the notch 64, so that the sensing wire 70 is fixed to the disk 62 as wound around the disk 62 or the guide groove 63.

As shown in FIG. 5, the case 41 has a side face 43b which is contiguous with the front face 43a. The side face 43b has mounting brackets 44a and 44b at an upper part and a lower part thereof respectively. In the mounting brackets 44a and 44b are formed screw holes 45a and 45b respectively for fixing the case 41 to the unit holder 25.

The description related to FIGS. 5 through 7 is summarized as follows: a) the case 41 is fixed to the unit holder 25 by screwing the mounting brackets 44a and 44b to the unit holder 25; b) the rotary shaft 42 and the shaft 61 of the disk 62 mesh with each other so as to permit the rotary wheel 60 to rotate integrally with the rotary shaft 42; and c) the sensing wire 70, as wound around the disk 62 by a predetermined length, is pulled out from the disk 62 in the width direction of the seat frame 22 against the rotational urging force of the rotary shaft 42 and then is connected to the side wall 24b of the seat frame 22 through the hook 71. Therefore, predetermined tension is applied to the sensing wire 70, which extends along the lower face of the cushion 20 between the two side walls 24a and 24b of the seat frame 22.

In this construction, when an occupant sits on the seat cushion 20 to apply his weight on the cushion 20, the sensing wire 70 is deformed downward together with the cushion 20. Such deformation of the sensing wire 70 causes itself to be pulled out from the disk 42 of the sensor unit 40. This pulled-out operation of the sensing wire 70 in turn causes the rotary wheel 60 or the rotary shaft 42 of the sensor unit 40 to be rotated. That is, the deformation of the sensing wire 70 is converted into the rotation of the rotary shaft 42.

Figure 8:
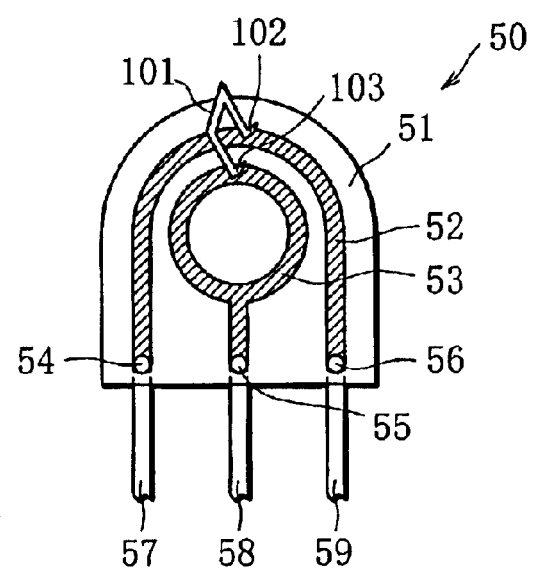
FIG. 8 is a schematic diagram for showing a variable resistor of the weight sensor device of FIG. 5.

To detect the rotation of the rotary shaft 42, a variable resistor 50 such as shown in FIG. 8 is incorporated in the case 42 of the sensor unit 40. The variable resistor 50 has an insulation board 51 and two resistor strips 52 and 53 formed on this insulation board 51. This insulation board 51 is made of, for example, laminate including glass and epoxy resin or ceramic. The resistor strip 52 is downward U-shaped as shown in FIG. 8. The resistor strip 53, on the other hand, is annular in shape and arranged in the resistor strip 52 concentrically therewith. That is, the resistor strip 53 is arranged concentrically with an arc of the resistor strip 52.

The resistor strip 53 has an extension, which protrudes in parallel with the two end portions of the resistor strip 52. The resistor strip 52 has terminals 54 and 56 at the ends thereof respectively, while the resistor strip 53 has a terminal 55 at an end of the extension thereof. These resistor strips 52 and 53 are formed for example by printing. Furthermore, from the terminals 54, 55, and 56 extend lead wires 57, 58, and 59 respectively.

Moreover, the variable resistor 50 has a sliding element 101. The sliding element 101 includes a leaf spring formed by bending a metal sheet having good conductivity, which is attached to the rotary shaft 42. The sliding element 101 has two legs 102 and 103. The sliding element 101 is pressed against the insulation board 51 so that the legs 102 and 103 can be in contact at all times with the resistor strips 52 and 53 respectively.

As mentioned above, when the rotary shaft 42 rotates, the legs 102 and 103 of the sliding element 101 slide on the resistor strips 52 and 53 respectively, in accordance with the rotation angle or number of revolutions of the rotary shaft 42. The resultant displacement of these legs 102 and 103 in turn brings about a change in electrical resistance value between the terminals 54 and 55 and a change in electrical resistance value between the terminals 55 and 56. If a predetermined voltage is applied between the terminals 54 and 56 beforehand, therefore, the rotation angle of the rotary shaft 42 can be determined by measuring the value of a voltage appearing at the terminal 55. Since the rotary shaft 42 rotates due to the deformation of the sensing wire 70, that is, the weight applied on the cushion 21, the weight can be determined by measuring the voltage value.

Figure 9:
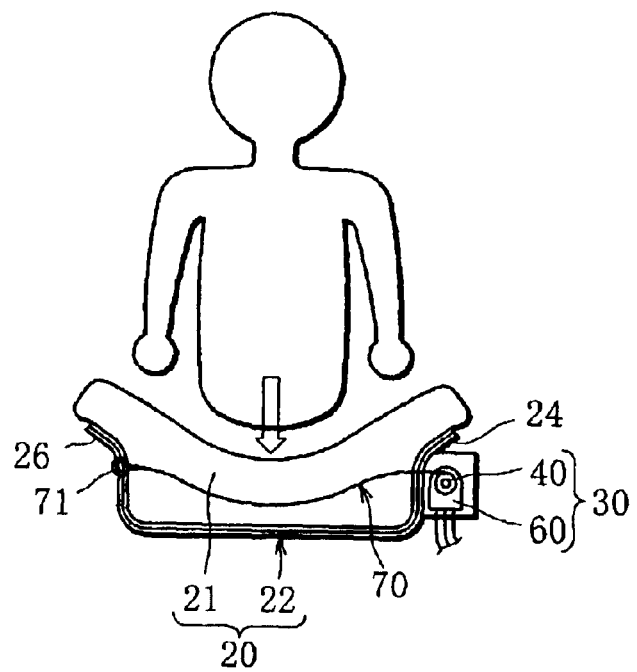
FIG. 9 is a cross-sectional front view for schematically showing a state where an occupant is seated on the seat with the weight sensor device of FIG. 5.
Figure 10:
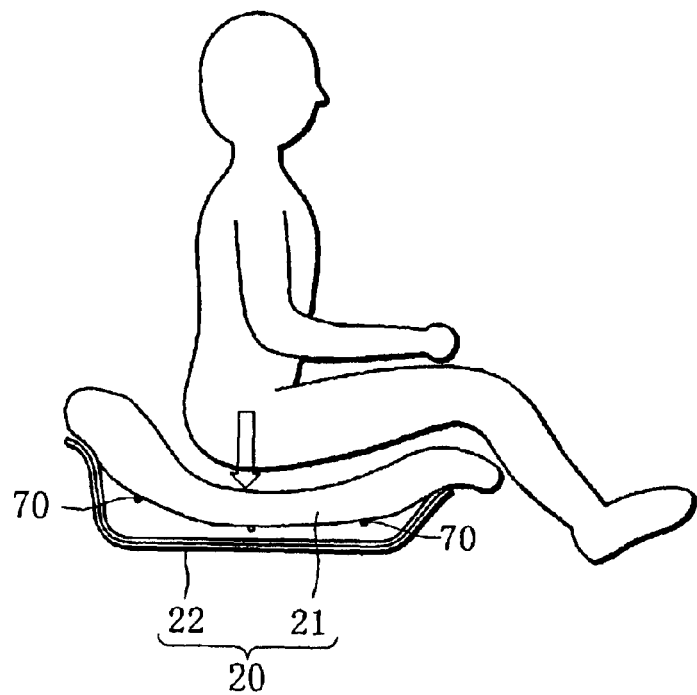
FIG. 10 is a cross-sectional side view of FIG. 9.

As shown in FIGS. 9 and 10, when the occupant sits on the seat cushion 20, the cushion 21 is deformed with respect to its initial state in which no weight is applied thereon and moves downward. In accordance with such deformation of the cushion 21, the sensing wire 70 is stretched by the cushion 21 so that the sensing wire 70 is deformed downward. As described above, as the sensing wire 70 is deformed, the rotary wheel 60 or the rotary shaft 42 of the sensor unit 40 rotates. Then, in association with the rotation of the rotary shaft 42, the legs 102 and 103 of the sliding element 101 shown in FIG. 8 slide on the resistor strips 52 and 53 respectively. As a result, there occurs the change in electrical resistance value between the lead wire 57 (terminal 54) and the lead wire 58 (terminal 55) and the change in electrical resistance value between the lead wire 58 (terminal 55) and the lead wire 59 (terminal 56).

As shown in FIGS. 2 and 3, the three weight sensors 30 are arranged below the cushion 21 and, therefore, each of the sensors 30 output a voltage value based on such a change in electrical resistance as to correspond to the weight applied on the sensing wire 70 of their own.

A correlation between the occupant's weight and an output of each of the weight sensors 30 has obtained beforehand by letting occupants having various body weights sit on the seat cushion 20. Based on thus obtained correlation and an output of each of the weight sensors 30, therefore, it is possible to determine the weight, that is, the body weight of the passenger.

It is to be here noted that, an average or a total sum of the outputs of each of the weight sensors 30 may be used to obtain the above-mentioned correlation. Further, instead of the average or total sum of the outputs, a value representative of the outputs may be used; the value can be obtained by processing the outputs of weight sensors 30 in accordance with other computing method.

Actually, when the occupant sits on the seat 10, the occupant's weight is applied as distributed to the seat cushion 20, the seat back 11, the head rest 12, a foot rest, a pedal and the like. Of these distributed weights, the one applied to the seat cushion 20 is the largest in proportion, so that based on this largest weight the occupant's body weight can be approximated in calculation.

The weight sensor 30 according to the present embodiment has a very simple configuration comprising only the sensor unit 40 and the sensing wire 70 and can be provided very inexpensively.

Furthermore, in the present embodiment, three weight sensors 30 have been provided, but the number of the weight sensors provided may be changed arbitrarily.

Figure 11:
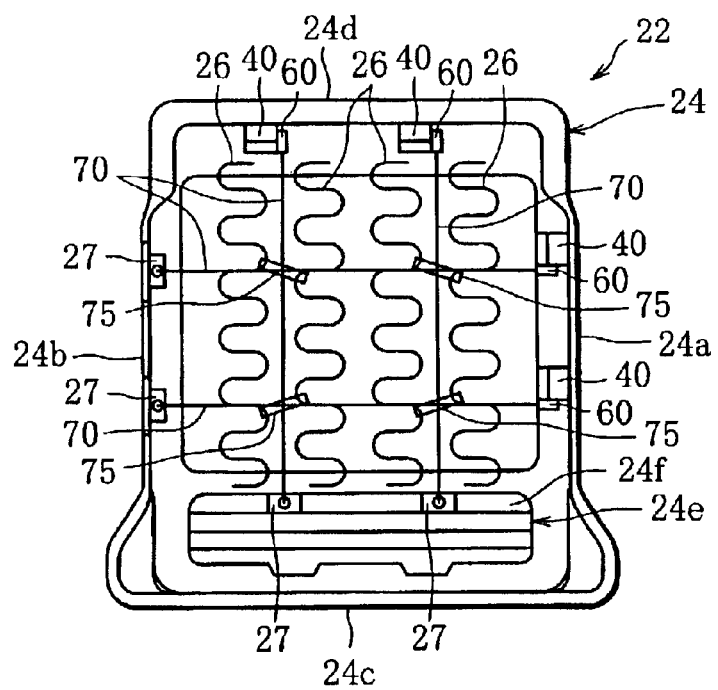
FIG. 11 is a plan view for showing a modification of the weight sensor device of the first embodiment.
Figure 12:
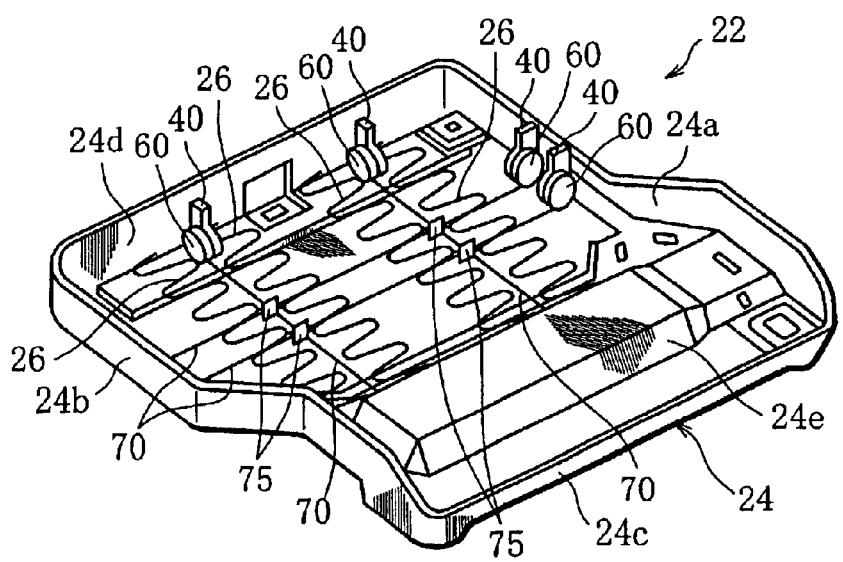
FIG. 12 is a perspective view for showing the modification of the weight sensor device of FIG. 11.

FIGS. 11 and 12 show a modification of the weight sensor 30 of the present embodiment Between the right and left side walls 24a and 24b and between the front and rear walls 24c and 24d of the seat frame 22 are stretched each two sensing wires 70 at the same height with respect the bottom of the seat frame 22. To one end of each of the sensing wires 70 is connected the sensor unit 40, which is fixed to one portion of the peripheral wall 24 of the seat frame 22. Furthermore, the other end of the sensing wire 70 is connected to the other portion of the peripheral wall 24 facing to the one portion thereof.

The sensing wires 70 stretched over the bottom of the seat frame 22 intersect with each other. Each of the intersections is provided with a buffer member 75 so that the mutually intersecting sensing wires 70 may not interfere with each other.

Figure 13:
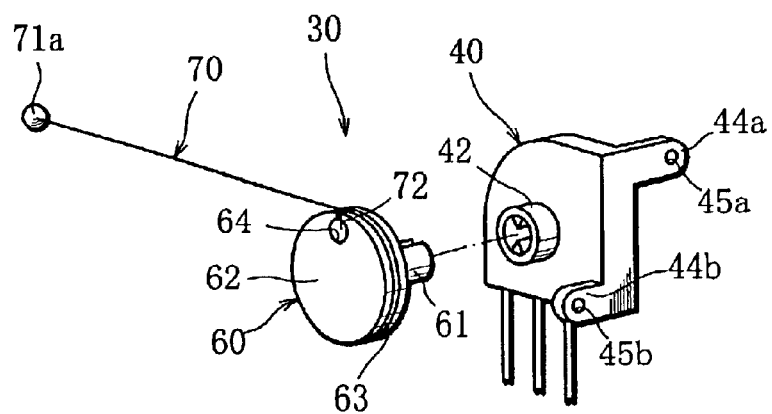
FIG. 13 is a perspective view for showing the weight sensor device of FIG. 11.

As shown in FIG. 13, at the other end thereof, the sensing wire 70 according to the present modification has a ball 71a similar to the ball 72 in place of the hook 71 of FIG. 5.

As shown in FIGS. 11 and 12, the front wall 24c of the seat frame 22 has an elevation 24e. This elevation 24e rises from the bottom wall 23 of the seat frame 22 as extending between the side walls 24a and 24b thereof.

The elevation 24e has a substantially trapezoid-shape and a substantially rectangular top face. Furthermore, the elevation 24e has a slant face 24f inclined from the top face toward the rear wall 24d. Between this slant face 24f and the rear wall 24d are stretched over two pair of meandering springs 26, each of the meandering springs 26 has a shape in which an S-character is repeated. These meandering springs 26 support the seat cushion mounted on the seat frame 22.

Figure 14:
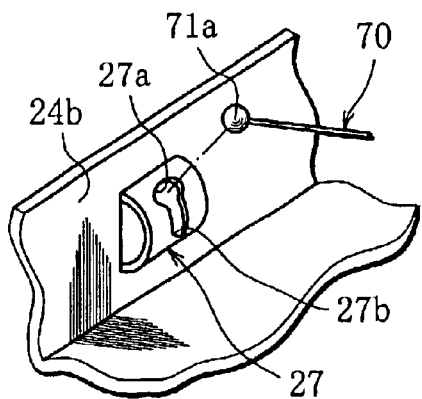
FIG. 14 is a perspective view for showing a retaining portion provided on a side wall of the seat frame of FIG. 11.
Figure 15:
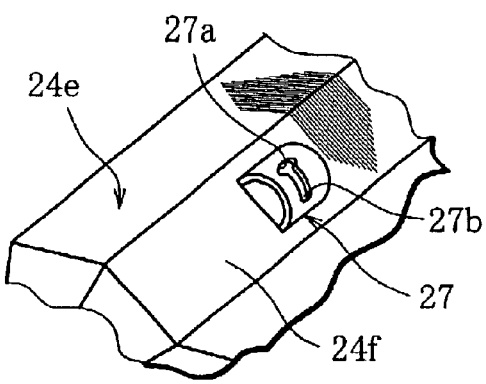
FIG. 15 is a perspective view for showing the retaining portion provided on a front wall of the seat frame of FIG. 11.

As shown in FIGS. 14 and 15, the sidewall 24b and the slant face 24f are each provided with two retaining portions 27, those on the slant face 24f being disposed between the meandering springs 26 paired with each other.

The retaining portions 27 of the side wall 24b are, for example, hollow semi-cylinder shaped, extending along the side wall 24b as shown in FIG. 14. More specifically, the retaining portion 27 is made of a substantially vault roof-shaped plate rising from the side wall 24b and has a substantially arc-shaped transverse section. The retaining portion 27 has at its middle a vertical slit 27b formed thereon, an upper part of which continues to a hole 27a having a little larger diameter than that of the ball 71a. Furthermore, as shown in FIG. 15, the retaining portion 27 of the slant face 24f of the elevation 24e is also hollow semi-cylinder shaped similar to the retaining portion 27 of the side wall 24b and has the hole 27a formed thereon which continues to the upper part of the slit 27b.

Figure 16:
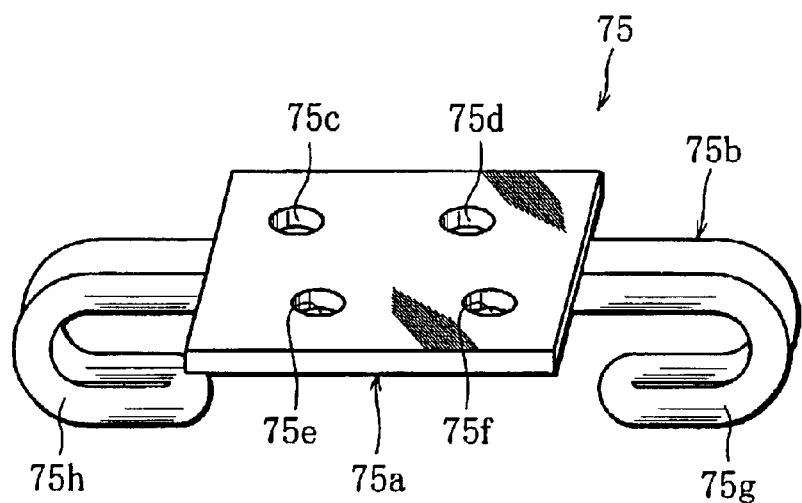
FIG. 16 is a perspective view for showing a buffer member of FIG. 11.

As mentioned above, the buffer member 75 shown in FIGS. 16 and 17 serves to prevent the mutually intersecting sensing wires 70 from interfering with each other. The buffer member 75 includes a main body 75b made of felt. The main body has a substantially rectangular shape, for example. The buffer member 75 further includes a pair of metal hook members 75b, which project from the two sides of the main body 75a respectively.

In the main body 75a are formed four insertion holes for insertion of the sensing wire 70, these insertion holes are arranged substantially at the respective four corners of a lozenge. Specifically, on one longer side portion of the main body 75a are formed the insertion holes 75c and 75d, while on the other longer side portion thereof are formed insertion holes 75e and 75f. The insertion holes 75c and 75f are positioned on one diagonal of the lozenge, through which is inserted, for example, the sensing wire 70 stretched over between the side faces 24a and 24b. The insertion holes 75d and 75e, on the other hand, are positioned on the other diagonal, through which is inserted, the sensing wire 70 stretched over between the front and rear faces 24c and 24d.

Ends of the paired hook members 75b are bent toward the main body 75a so as to form hooks 75g and 75h respectively.

Figure 17:
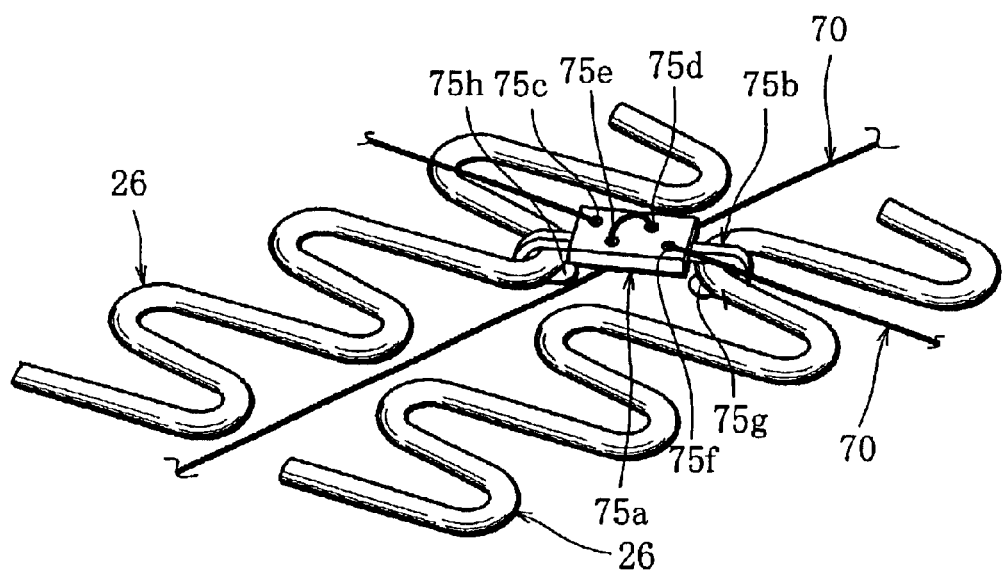
FIG. 17 is a perspective view for showing a state where the sensing wire is passed through the buffer member of FIG. 16 and the buffer member is hooked on meandering springs.

That is, both the hooks 75g and 75h have substantially a J-shape and hook mouths facing each other. As shown in FIG. 17, the hooks 75g and 75h holds the corresponding meandering springs 26. It is to be noted that the material of the main body 75a is not limited to felt but may be any material as far as it will not cause the sensing wire 70 to wear.

Second Embodiment

The following will describe a weight sensor device of the second embodiment according to the present invention.

Figure 18:
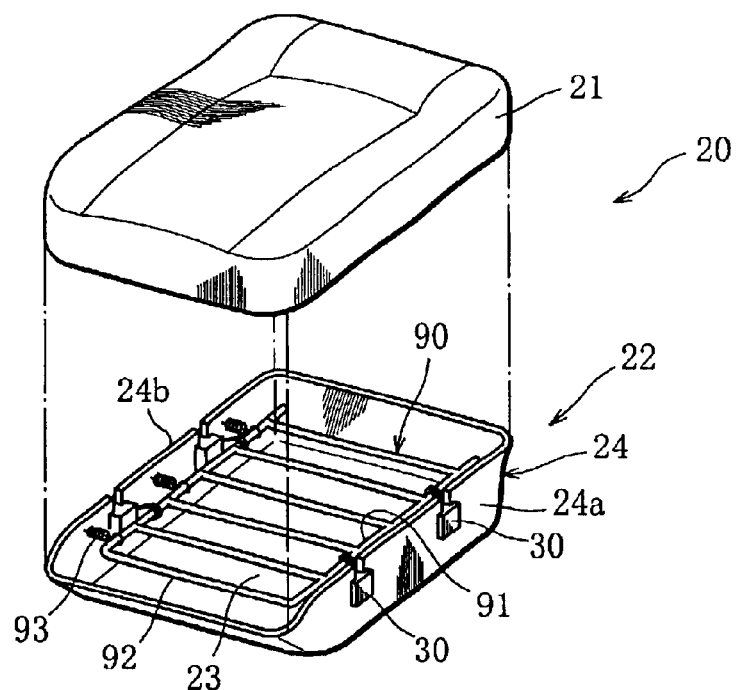
FIG. 18 is a perspective view for showing a seat cushion with a weight sensor device of a second embodiment according to the present invention.
Figure 19:
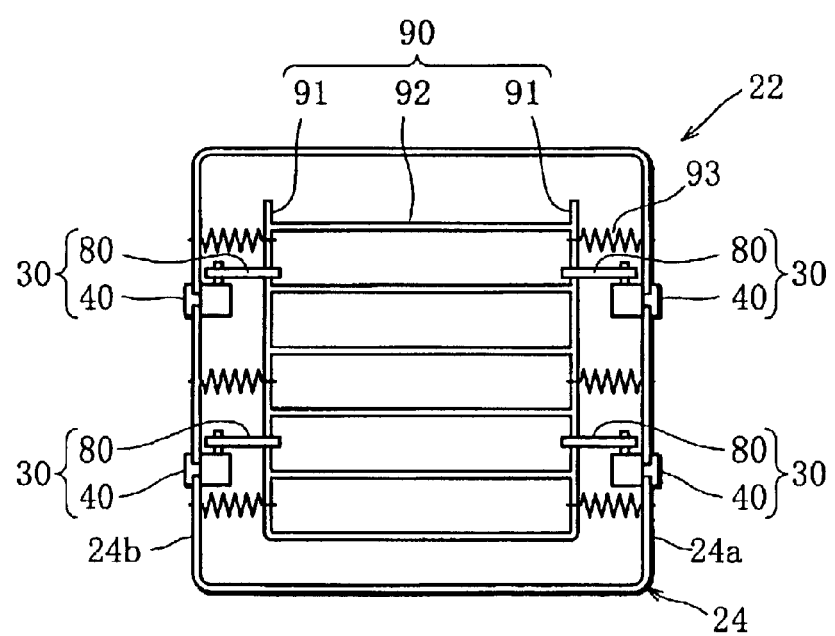
FIG. 19 is a plan view for showing a seat frame of the seat cushion of FIG. 18.
Figure 20:
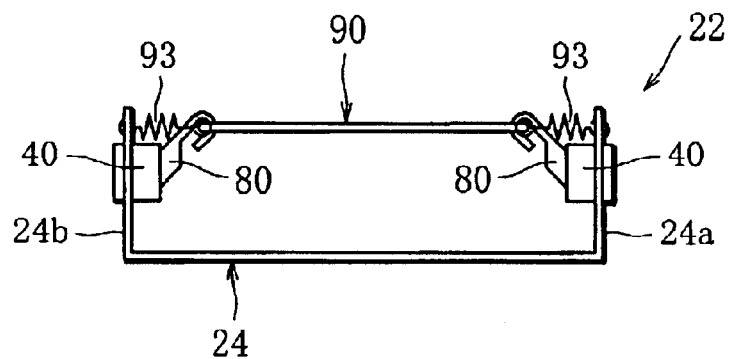
FIG. 20 is a cross-sectional side view of seat frame of FIG. 19e.

As shown in FIGS. 18 to 20, the seat cushion 20 is provided with a net 90, which is arranged in the seat frame 22. The cushion 21 is mounted on the net 90. The net 90 includes two side bars 91 which extend along the side walls 24a and 24b of the seat frame 22 respectively and, for example, six cross bars 92, each of which connects these side bars 91 to each other. Between each side bar 91 and the corresponding side wall 24a or 24b is stretched over a plurality of (six in total in the present embodiment) coil springs 93 for supporting the net 90.

Between the net 90 and each of the side walls 24a and 24b is arranged a plurality of (four in total in the present embodiment) weight sensors 30.

Figure 21:
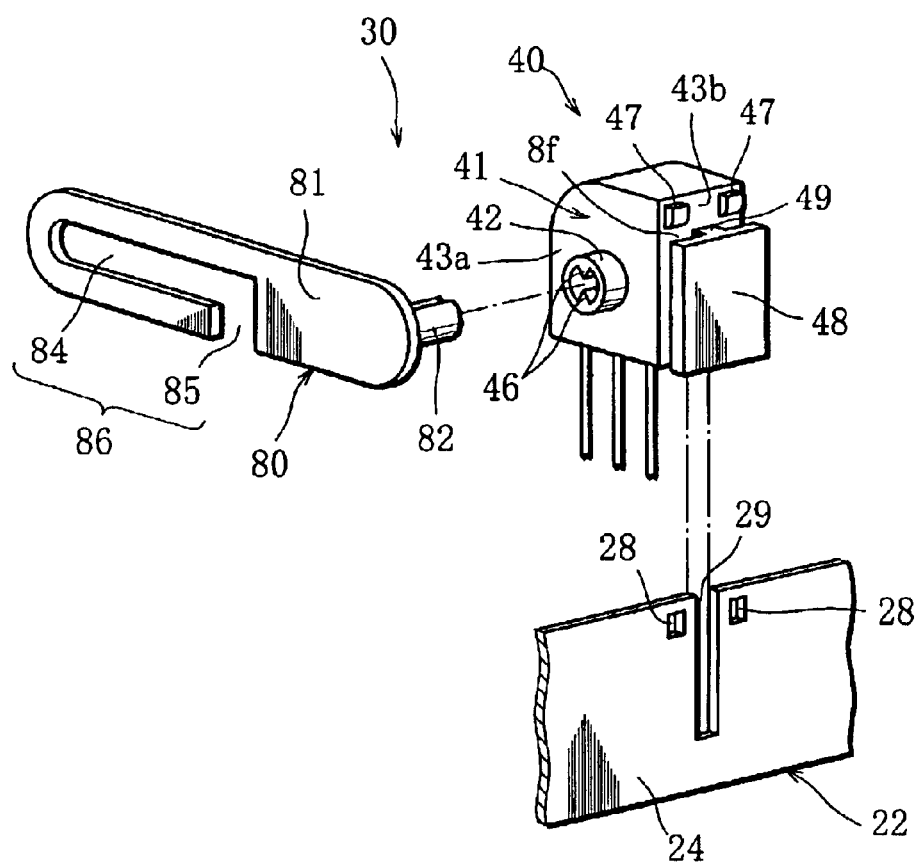
FIG. 21 is a an exploded perspective view for showing the weight sensor of FIG. 20.

As shown in FIG. 21, the weight sensor 30 comprises the sensor unit 40 and a hook member 80. The case 41 of the sensor unit 40 is fixed to the corresponding side wall 24a or 24b. The hook member 80 connects the rotary shaft 42 of the sensor unit 40 and the corresponding side bar 91 of the net 90.

More specifically, the hook member 80 has a hook plate 81 and a shaft projecting from one end of the hook plate 81, which shaft 82 is similar in shape to the above-mentioned shaft 61 and fitted into the rotary shaft 42 of the case 41. The hook member 80, therefore, rotates integrally with the rotary shaft 42.

Both ends of the hook plate 81 have a substantially semi-circle shape, respectively, for example. In the other end portion of the hook plate 81 is formed an elongated hole 84, which extends toward one end of the hook plate 81. The end of the elongated hole 84 positioned at the one end of the hook plate 81 is opened through an opening 85 to a side edge of the hook plate 81 so that the other end of the hook plate 81 can form a hook 86. In this configuration, the width of the elongated hole 84 and the opening 85 are set slightly larger than the diameter of the side bar 91. It is thus possible to have the hook 86 of the hook member 80 engaged at the side bar 91 of the net 90, in such a configuration that the side bar 91 is free to slide in the elongated hole 84 of the hook plate 81.

As shown in FIG. 21, the case 41 of the sensor unit 40 has a pair of locking portions 47 at the upper end portion of the side face 43b. The locking portions 47 are arranged horizontally with a predetermined spacing set therebetween and project from the side face 43b. The top face of each of the locking portions 47 is flat and substantially perpendicular to the side face 43b. Furthermore, the locking portions 47 have sector shape as viewed in a vertical section.

Furthermore, the side face 43b of the case 41 is provided with a pinch plate 48, which is arranged below the locking portions 47. This pinch plate 48 is substantially T-shaped as viewed in a cross section and connected to the side face 43b through a guide portion 49 thereof.

The side wall 24a or 24b of the seat frame 22, on the other hand, has a rectangular guide groove 29 formed therein, which extends downward from the upper edge of the side wall. The guide groove 29 can receive the guide portion 49 of the pinch plate 48 therein. Therefore, the sensor unit 40 or the case 41 is attached to the side wall 24a or 24b by inserting the guide portion 49 of the pinch plate 48 into the guide groove 29 up to the bottom thereof. Then, the side wall is sandwiched by the side face 43b of the case 41 and the pinch plate 48.

Figure 22:
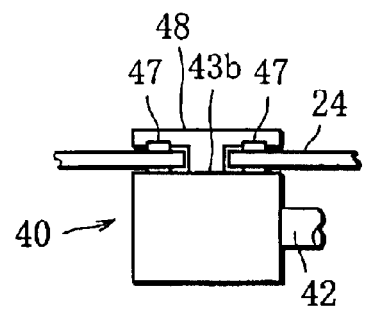
FIG. 22 is a plan view for showing a sensor unit of FIG. 20.
Figure 23:
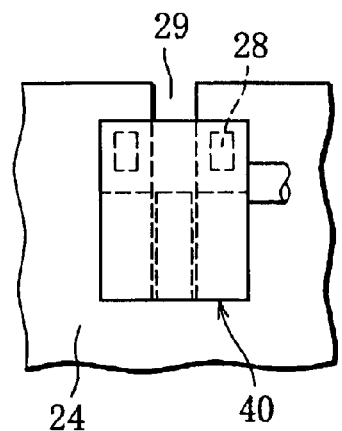
FIG. 23 is a side view for showing the sensor unit of FIG. 20.
Figure 24:
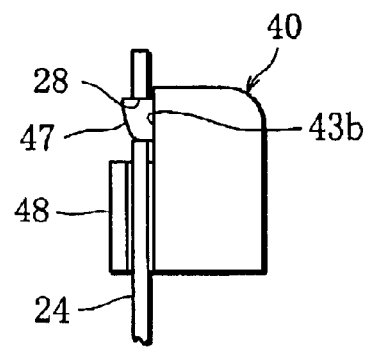
FIG. 24 is a cross-sectional front view for showing the sensor unit of FIG. 20.

Furthermore, the side wall has two locking holes 27 formed therein as to correspond to the above-mentioned locking portions 47. As shown in FIGS. 22 to 24, therefore, when the sensor unit 40 is mounted, the locking portions 47 of the case 41 are fitted into the corresponding locking holes 27 in the side wall. The locking holes 27 prevent the locking portions 47 from being lifted so that the sensor unit 40 cannot readily be pulled out from the side wall of the seat frame 22.

Figure 25:
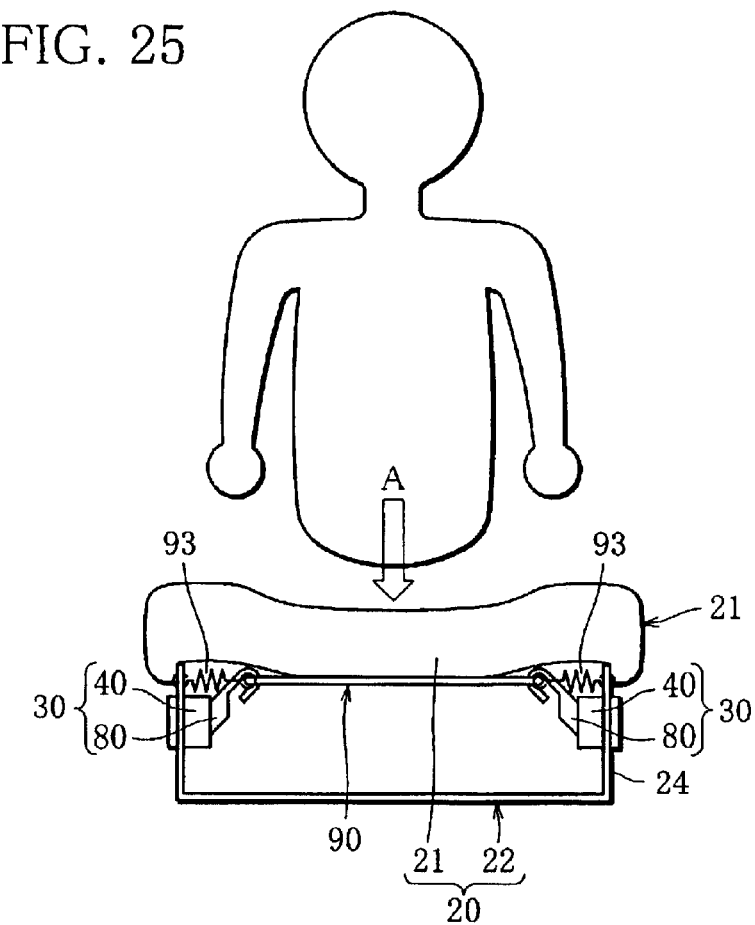
FIG. 25 is a cross-sectional front view for schematically showing a state where the occupant is seating on the seat cushion with the weight sensor of the second embodiment.
Figure 26:
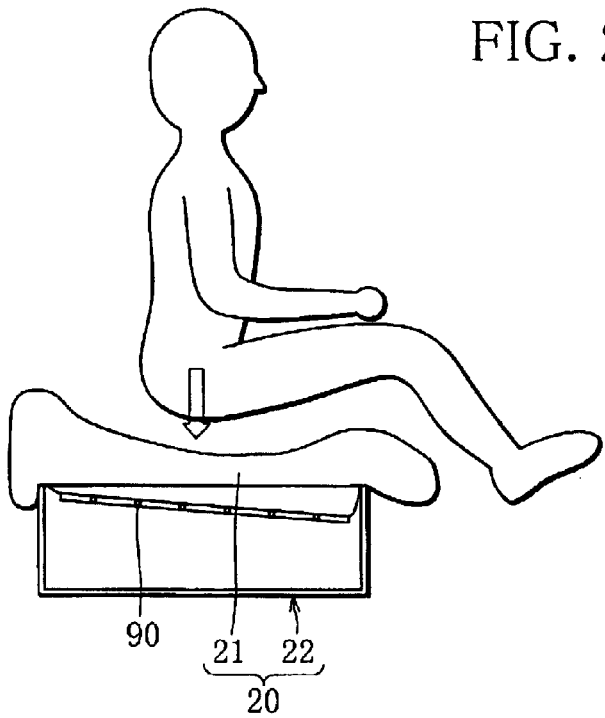
FIG. 26 is a cross-sectional side view for schematically showing the state where the occupant is seating on the seat cushion of FIG. 25.

As shown in FIGS. 25 and 26, when an occupant sits on the seat cushion 20, the cushion 21 is deformed downward due to the weight of the occupant applied thereon. Such deformation of the cushion 21 causes the net 90 to be displaced downward against the urging force of the coil springs 93. This displacement in turn causes the hook member 80 of the sensor unit 40 to turn. As a result, the weight sensors 30 according to this second embodiment can detect the weight of the occupant.

Figure 27:
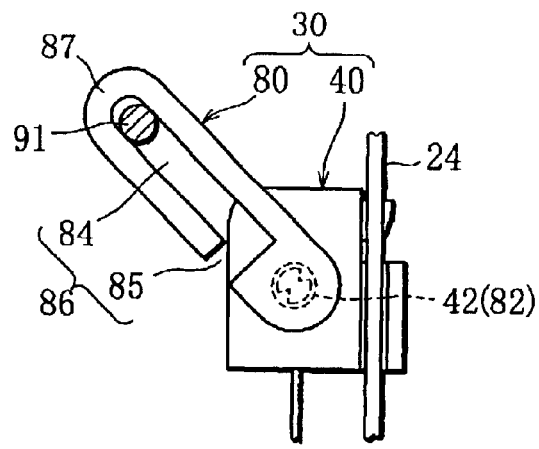
FIG. 27 is a front view for showing a state of the sensor unit of FIG. 20 when the occupant is not seated on the seat cushion.
Figure 28:
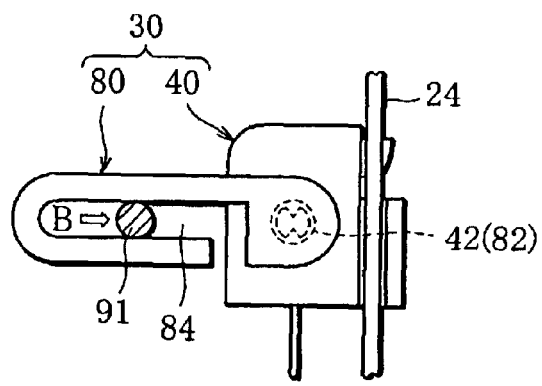
FIG. 28 is a front view for showing a state of the sensor unit of FIG. 20 when the occupant is seated on the seat cushion.

More specifically, when the occupant is not seated on the seat cushion 20, as shown in FIG. 27, the hook 86 of the hook member 80 is engaged at the side bar 91 of the net 90 as positioned above the rotary shaft 42 of the sensor unit 40. When the occupant sits on the seat cushion 20, on the other hand, the net 90 is displaced downward. This displacement then causes the hook member 80 to turn around the axis of the rotary shaft 42, thus permitting the side bar 91 to slide in the elongated hole 84 in the hook member 80 (in a direction of an arrow B) as shown in FIG. 28. The hook member 80 is thus turned to then rotate the rotary shaft 42, which causes the sliding element 101 of the variable resistor 50 to move, which in turn gives rise to a change in output of the variable resistor 50.

Of course, by the second embodiment also, almost the same correlation as that by the first embodiment has obtained beforehand.

The weight sensor 30 has also a simple configuration comprising only the sensor unit 40 and the hook member 80 and can be provided inexpensively.

The present embodiment does not restrict the number of the weight sensors provided to four either.

Figure 29:
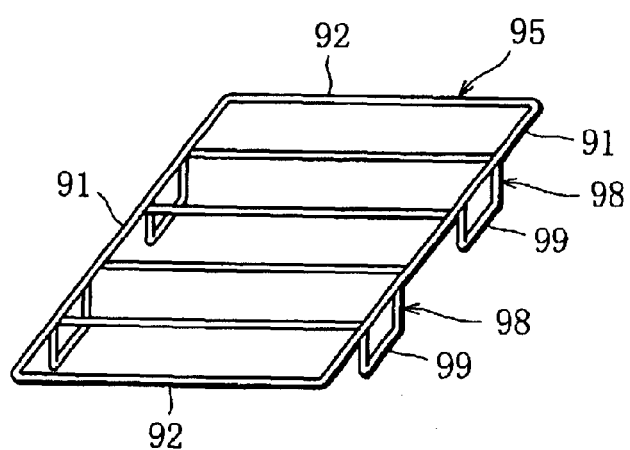
FIG. 29 is a perspective view for showing a modification of the net of the second embodiment.

FIG. 29 shows a modification net 95. This net 95 differs from the net 90 only in one respect that hook catching portions 98 are provided to each of two side bars 91. These hook-catching portions 98 are substantially C-shaped, an open side of which is linked to the side bar 91, projecting downward from therefrom.

Figure 30:
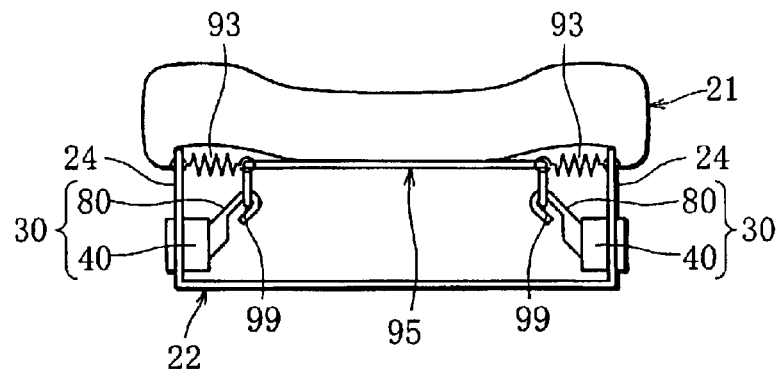
FIG. 30 is a cross-sectional front view for showing a seat cushion provided with the net of FIG. 29.
Figure 31:
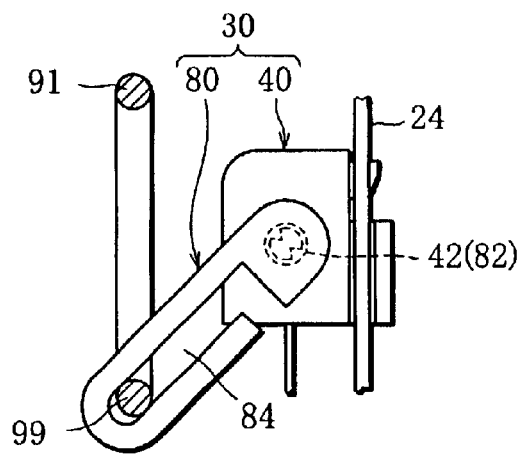
FIG. 31 is a front view for showing a state of the sensor unit of FIG. 30 when the occupant is seated on the seat cushion mounted.

In the above-mentioned net 95, as shown in FIG. 30, hook member 80 is engaged not at the side bar 91 of the net 95 but at a horizontal bar 99 of the hook catching portion 98. In this case, the sensor unit 40 is mounted at a lower position than that when the net 90 is used. In this configuration, when an occupant sits on the seat cushion 20 and the net 95 is resultantly displaced downward, the hook 86 of the hook member 80 can be displaced downward below the rotary shaft 42 of the sensor unit 40. That is, as shown in FIG. 31, even if the net 95 is displaced downward, the sensor unit 40 can stay below the side bar 91 always, thus providing such an advantage as to avoid interference between the sensor unit 40 and the cushion 21.

Figure 32:
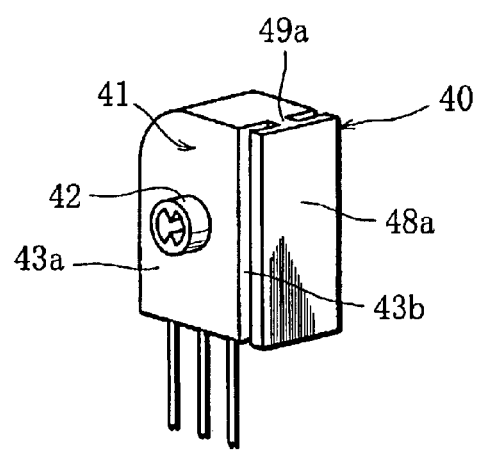
FIG. 32 is a perspective view for showing a modification of the sensor unit of FIG. 22.

FIG. 32 shows a modification of the sensor case 41. In this case, a pinch plate 48a and a guide portion 49a of the case 41 of FIG. 32 differs from the pinch plate 48 and guide portion 49 of FIG. 14 in a respect that these extend to the upper end of the side face 43b.

Figure 33:
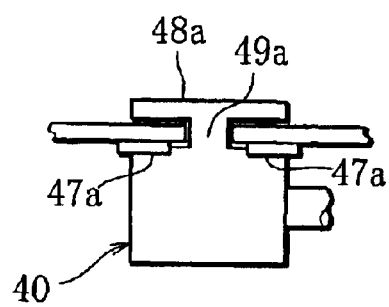
FIG. 33 is a plan view for showing the sensor unit of FIG. 32.
Figure 34:
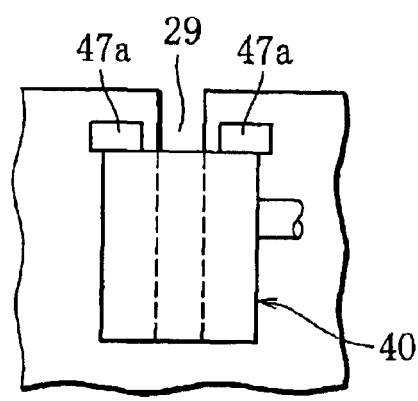
FIG. 34 is a side view for showing the sensor unit of FIG. 33.
Figure 35:
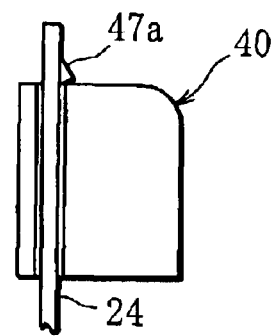
FIG. 35 is a cross-sectional front view for showing the sensor unit of FIG. 34.

FIGS. 33 to 35 show states where the sensor unit 40 is mounted to the side wall 24a or 24b of the seat frame 22.

As is clear from FIGS. 33 to 35, a pair of engagement portions 47a is provided on the both o sides of the guide groove 29 respectively on the side wall of the seat frame 22. The engagement portions 47a are a triangular protrusion. More specifically, the engagement portions 47a are substantially rectangular as viewed from the side of the side wall and substantially right-angle triangular as viewed in a vertical section. That is, the engagement portion 47a has a slant face extending from the upper edge to the lower edge of the side wall and a horizontal face interconnecting the lower edge of this slant face and the side wall.

When the guide portion 49a of the case 41 is inserted into the guide groove 29 in the side wall of the seat frame 22, the side face 43a of the case 41 goes beyond the pair of the engagement portions 47a. When the case 41 is mounted to the side wall, therefore, the lower end of the engagement portion 47a butts against the top face of the case 41, thus preventing the case 41 from readily going out of the guide groove 29.

Figure 36:
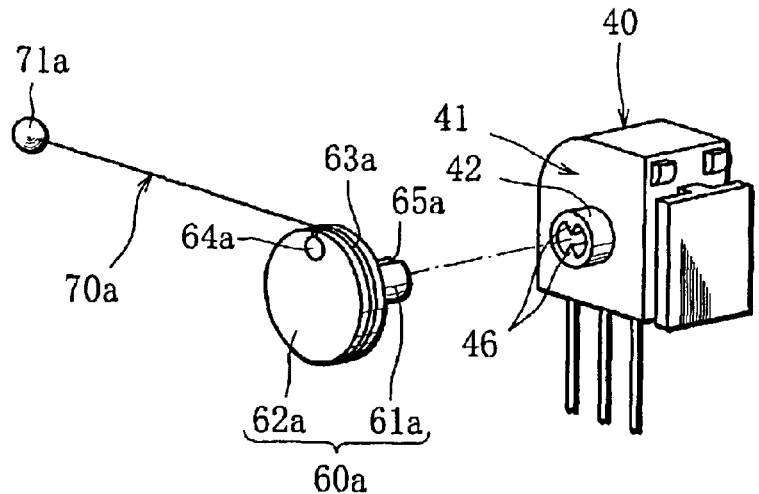
FIG. 36 is a perspective view for showing a modification of the weight sensor device of the second embodiment.

As shown in FIG. 36, the hook member 80 of FIG. 21 is replaced by a combination of a rotary wheel 60a, a wire 70a, and a substantially spherical ball 71a. The rotary wheel 60a is almost the same as the rotary wheel 60 of FIG. 13, while the wire 70a is used in place of the sensing wire 70 of FIG. 13. The sensor unit 40 is almost the same as that of FIG. 21.

Figure 37:
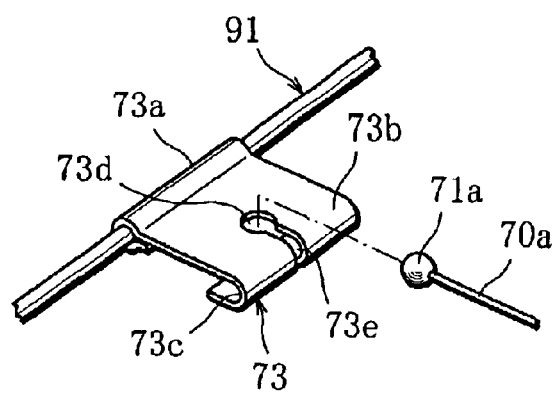
FIG. 37 is a perspective view for showing an engagement member for engaging the sensing wire of FIG. 36 with the net.
Figure 38:
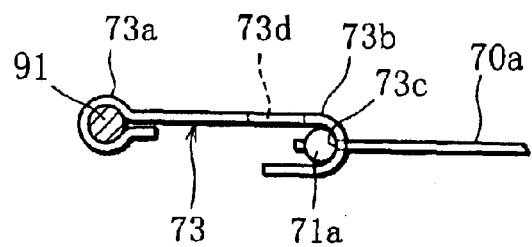
FIG. 38 is a front view for showing the engagement member of FIG. 37.

As shown in FIGS. 37 and 38, the ball 71a is engaged at the net 90 through a retaining piece 73. The retaining piece 73 is formed of a substantially rectangular plate member, one end of which is formed as a substantially U-shaped bend 73c and also has a retaining hole 73d formed therein having a little larger inner diameter than the diameter of the ball 71a as well as a slit 73e formed therein which is contiguous to the hole 73d. By fitting the ball 71a into the retaining hole 73d to pass t the wire 70a through the slit 73e and then shifting the ball 71a so that the ball 71a can be received on the bottom of the U-shaped bend 73c, the wire 70a is caught by the retaining piece 73. Then, the retaining piece 73 is fixed to the side bar 91 by winding the other end 73a thereof around the side bar 91.

By thus connecting the sensor unit 40 and the net 90 to each other, the wire 70a has its one end wound around the rotary wheel 60a or the guide groove 63a thereof owing to the tension of a return spring (not shown) and also is stretched over between the net 90 and the rotary wheel 60a.

Figure 39:
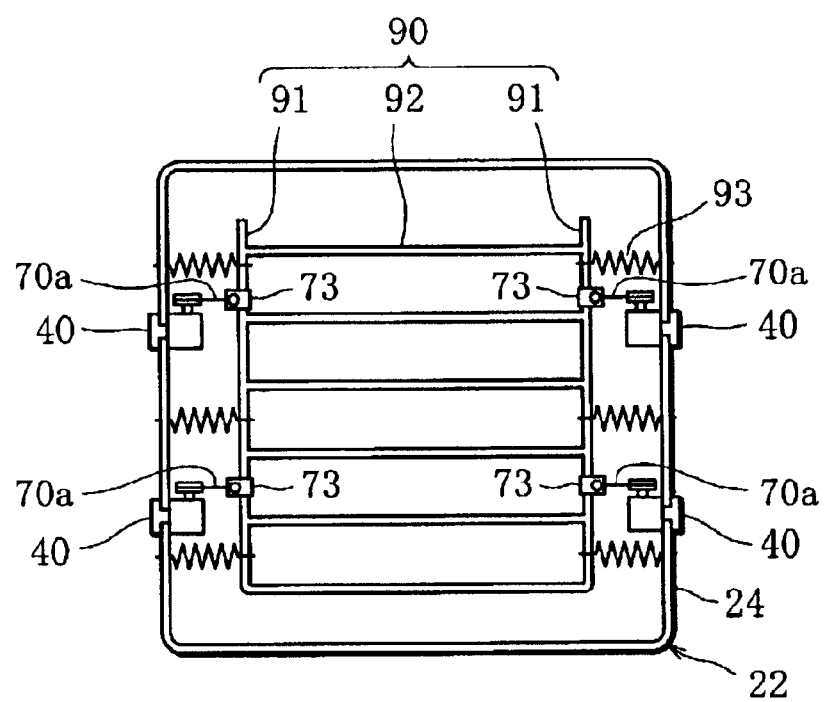
FIG. 39 is a plan view for showing a seat frame with the weight sensor device of FIG. 36.
Figure 40:
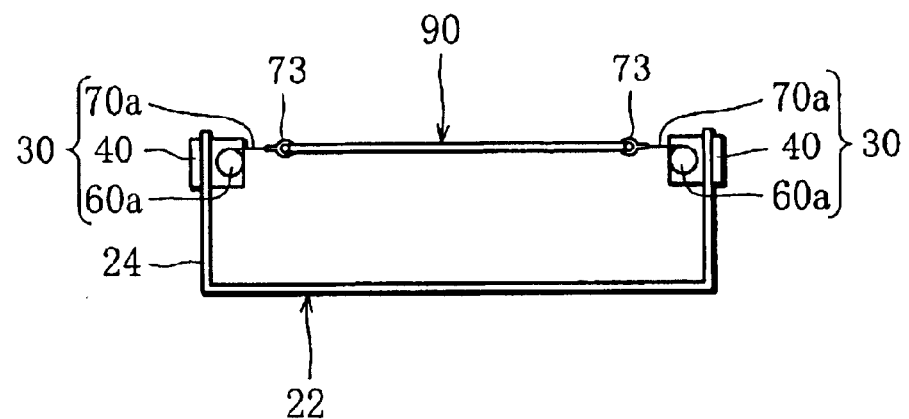
FIG. 40 is a cross-sectional front view for showing the seat frame of FIG. 39.

As shown in FIG. 39 and 40, the weight sensors 30 are mounted to the seat frame 22. When the net 90 is displaced downward due to the weight of an occupant applied thereon, the net 90 pulls the wire 70a, which in turn rotates the rotary wheel 60a.

Third Embodiment

Figure 41:
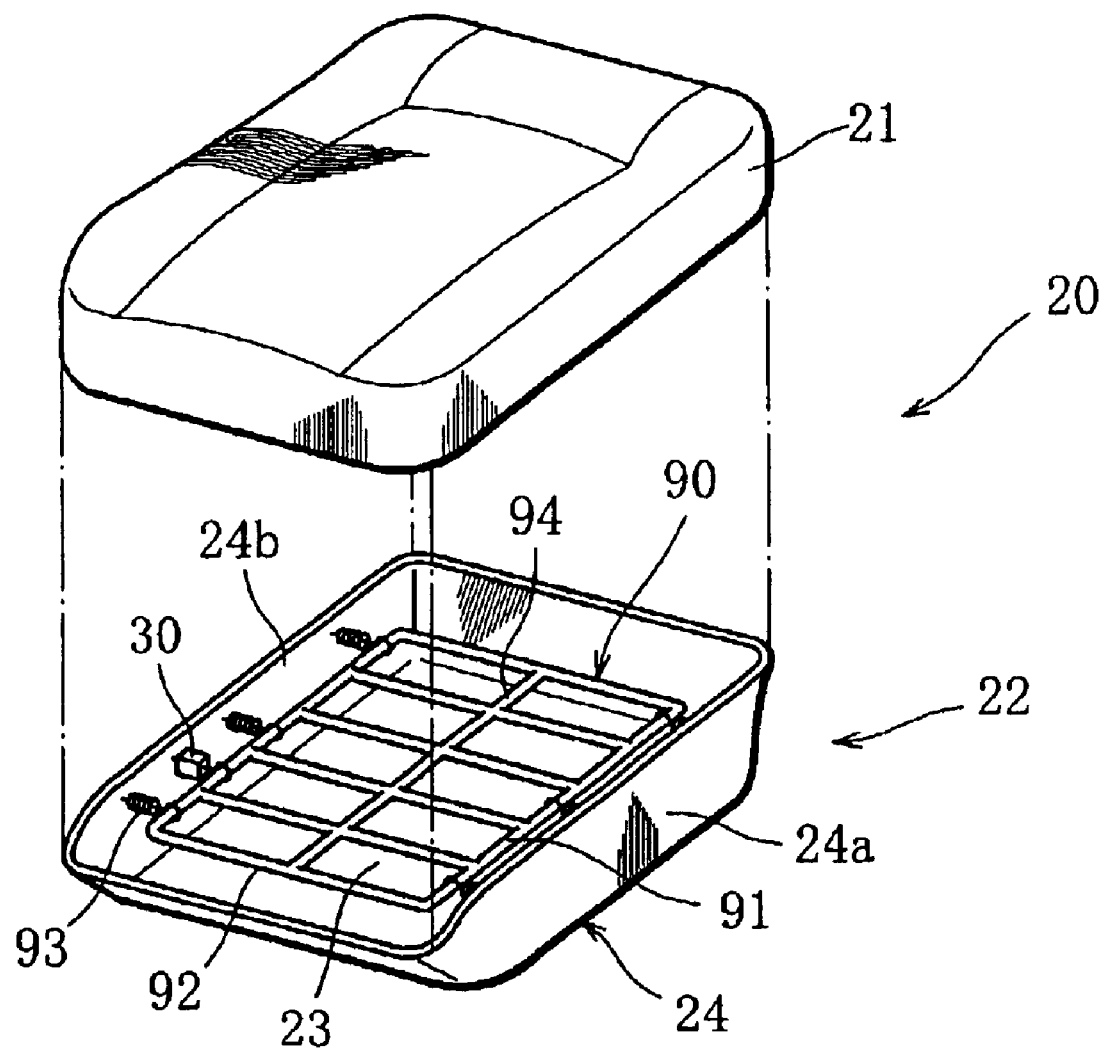
FIG. 41 is a perspective view for showing a seat cushion with a weight sensor device of a third embodiment according to the present invention.

FIG. 41 shows the seat cushion 20 provided with weight sensors according to the third embodiment according to the present invention.

As is clear from FIG. 41, the net 90 further includes a center bar 94 at the center between the two side bars 91. The bars 91, 92, and 94 that make up the net 90 are all made of spring wires, so that the net 90 is a spring net in the present embodiment. When an occupant sits on the seat cushion 20, therefore, the net 90 deforms together with the cushion 20 and the coil springs 93, thus improving the comfortableness in sitting.

Figure 42:
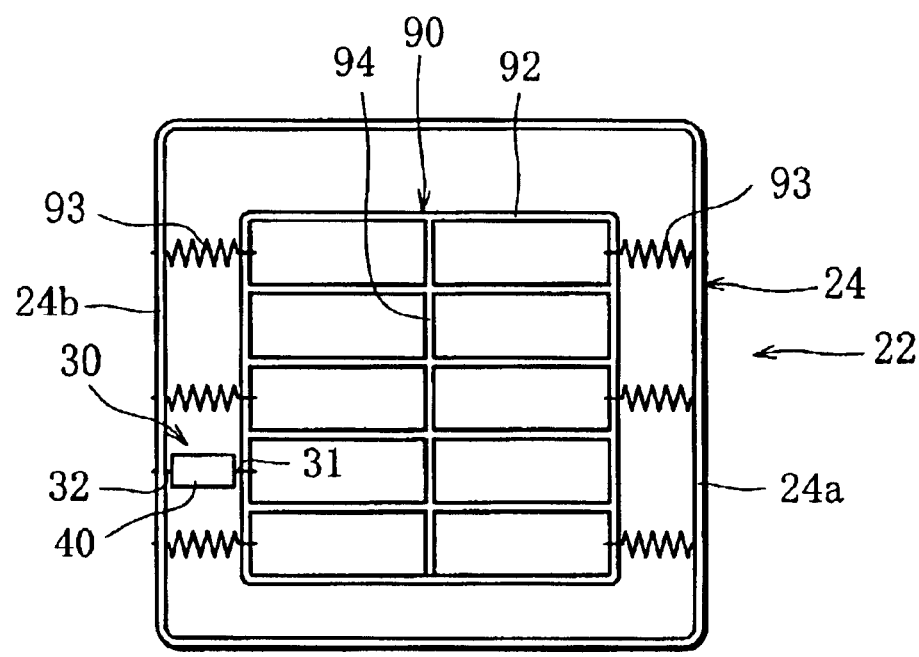
FIG. 42 is a plan view for showing a seat frame of the seat cushion of FIG. 41.
Figure 43:
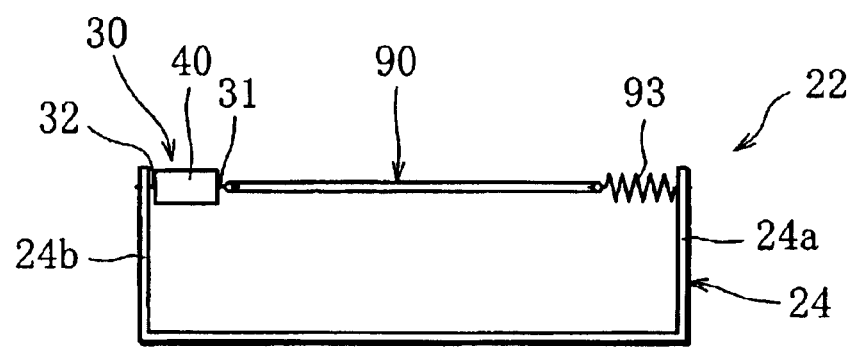
FIG. 43 is a cross-sectional front view for showing the seat frame of FIG. 42.

In this third embodiment, as shown in FIGS. 42 and 43, one weight sensor 30 is provided between the seat frame 22 and the net 90.

The weight sensor 30 has a first hook member 31 which interconnects a sensor unit 40 and the side bar 91 of the net 90 and a second hook member 32 which interconnects the sensor unit 40 and the side wall 24b of the seat frame 22.

Figure 44:
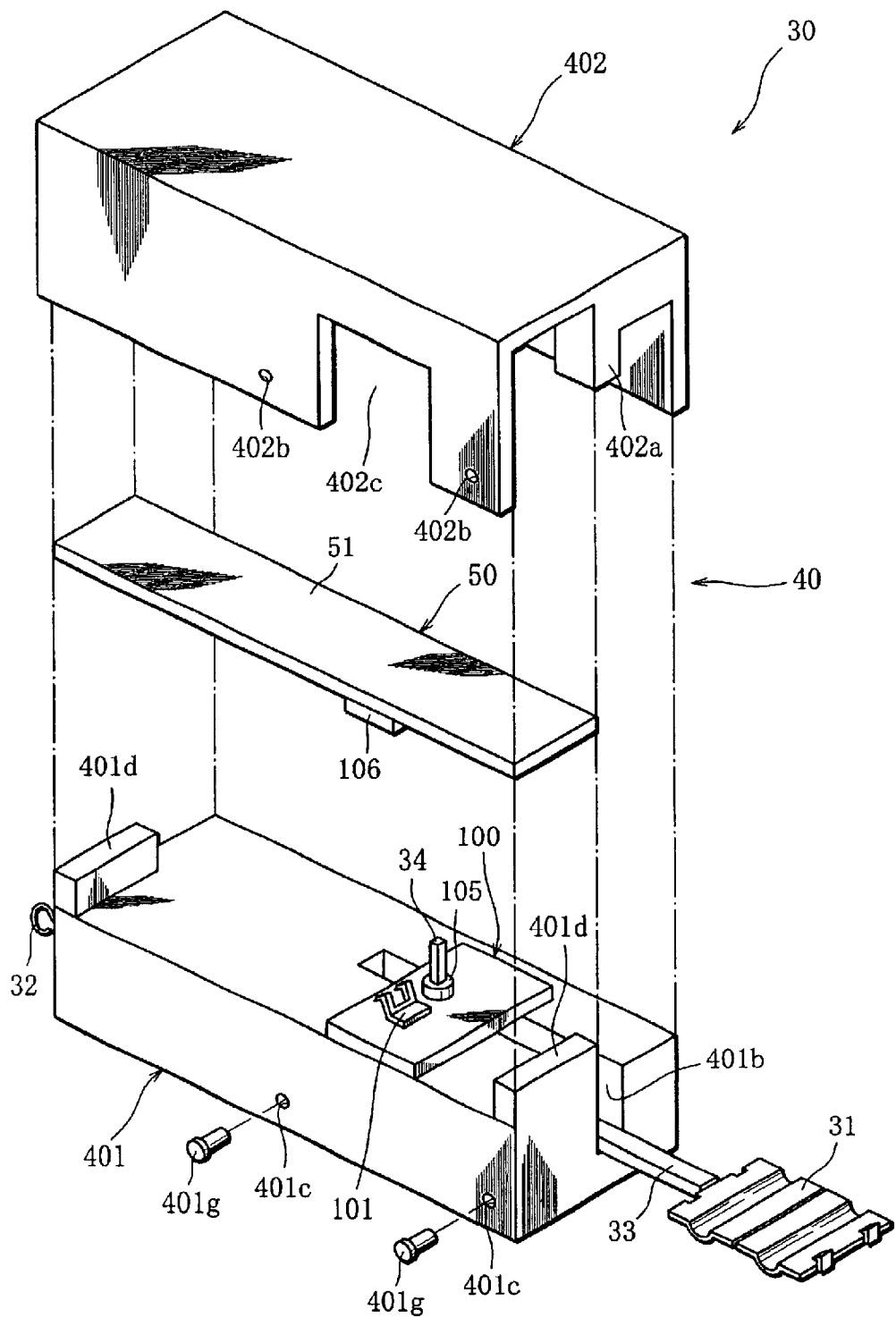
FIG. 44 is an exploded perspective view for showing the weight sensor device of FIG. 41.

As shown in FIG. 44, the sensor unit 40 has a case 401 and a cover 402. The case 401 and the cover 402 are connected to each other by bolts 401g. The these bolts 401g are screwed into threaded holes 401c in the case 401 through holes 402b in the cover 402, respectively.

On the top face of the case 401 is mounted a slider 100. This slider 100 can slide along a groove 401b. The groove 401b is opened to the upper face and one end face of the case 401.

The slider 100 is connected to the first hook member 31 through a rod 33, which slidably extends in the groove 401b. The first hook member 31, therefore, can reciprocate smoothly.

Furthermore, the cover 402 has a protrusion 402a formed thereon. When the cover 402 is attached to the case 401, the protrusion 402a is inserted into the groove 401b in the case 401 to thereby press down the rod 33 in the groove 401b, thus guiding the sliding of the rod 33.

As is clear from FIG. 44, the case 401 has two protrusions 401d formed at the opposite ends on the top face thereof. These protrusions 401d support the insulation board 51, of the variable resistor 50, extending therebetween. The protrusions 401d thus preserves a sufficient space between the insulation board 51 and the slider 100 so that the slider 100 can slide without interfering with the insulation board 51.

In this configuration, the second hook member 32 is fixed at the other face of the case 401.

Figure 45:
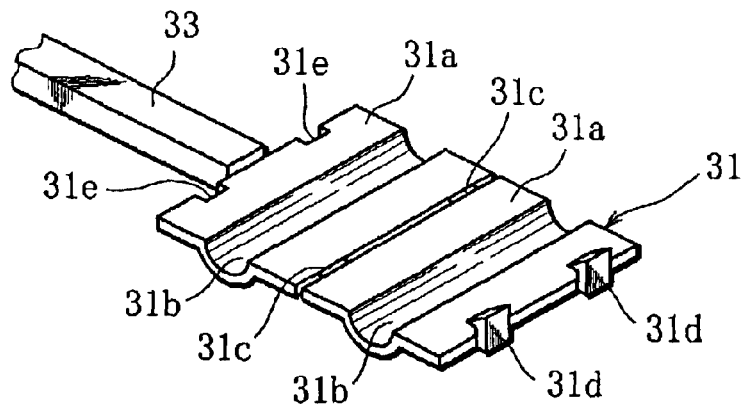
FIG. 45 is a perspective view for showing a state before a cramp member of FIG. 44 is fixed to the net.

As shown in FIG. 45, the first hook member 31 has a pair of clamp plates 31a, which are connected to each other through a pair of hinges 31c. One of the clamp plates 31a is connected to the rod 33 and has a pair of latch grooves 31e formed in the rod-side edge thereof. The other clamp plate 31a has a pair of latch claws 31d, which can engage with the latch grooves 31e respectively.

Furthermore, each of the clamp plates 31a has a groove 31b formed thereon which is semi-circle shaped as viewed in a cross section.

Figure 46:
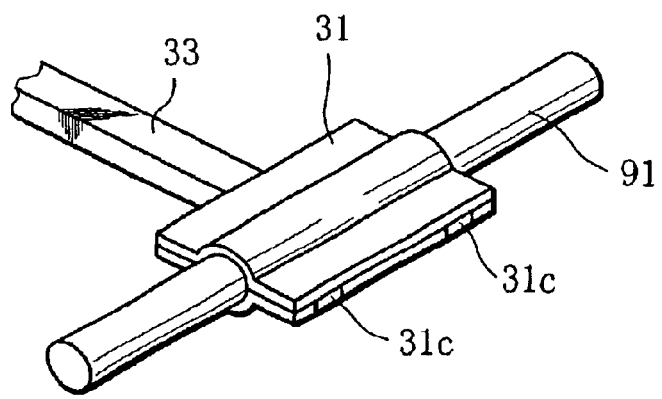
FIG. 46 is a perspective view for showing a state after the cramp member is fixed to the net.

In such a configuration, with the groove 31b of the rod-side clamp plate 31a as fitted to the side bar 91 of the net 90, the other clamp plate 31a is turned around the hinges 31c to be superposed on the rod-side clamp plate 31a, thus engaging the latch claws 31d in the latch grooves 31e respectively. Accordingly, as shown in FIG. 46, the first hook member 31 is connected to the side bar 91 in such a state that the side bar 91 is sandwiched by the pair of the clamp plates 31a, that is, in such a state that the side bar 91 is passed into the passage defined between the grooves 31b of these clamp plates 31a.

It is to be noted that the second hook member 32 may also have almost the same fold-type construction as that of the first hook member 31.

Figure 47:
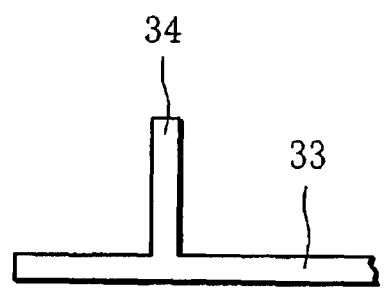
FIG. 47 is a side view for showing a r part of a rod extending from the cramp member.

As shown in FIG. 47, a linkage portion 34 extends upward from the rod 33 of the first hook member 31 for interconnecting the rod 33 and the slider 100 and has a rectangular cross section.

Figure 48:
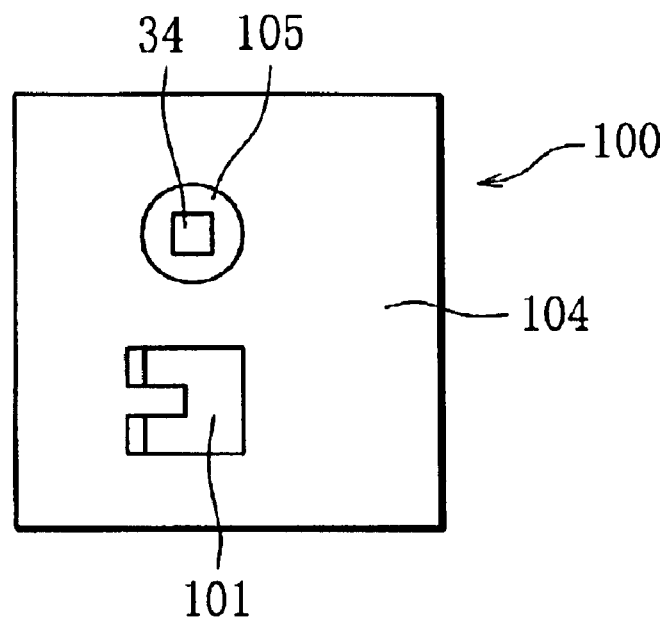
FIG. 48 is a plan view for showing a slider of the weight sensor device of the third embodiment.
Figure 49:
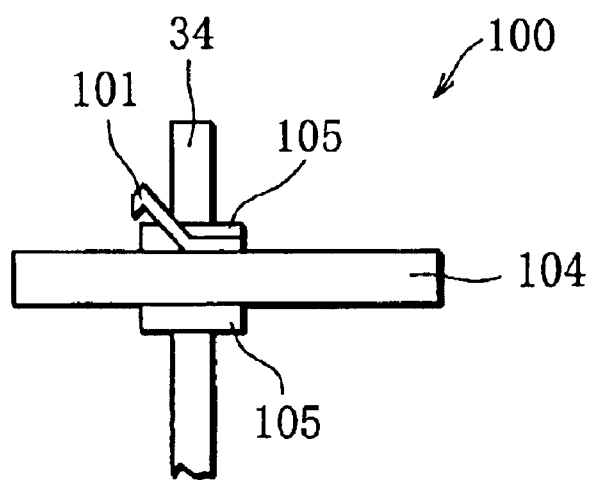
FIG. 49 is a side view for showing the slider of FIG. 48.

More specifically, as shown in FIGS. 48 and 49, the slider 100 has a plate-shaped base 102, through which the above-mentioned linkage portion 34 passes through upper and lower fixtures 103. These fixtures 103 are attached to the upper and lower surfaces of the base 102 respectively and each have a rectangular through hole. The through hole of the fixtures 103 permits the linkage portion 34 to pass through but prevents the base n 102 from turning with respect to the linkage portion 34.

Furthermore, the base 102 is mounted with the sliding element 101 on the upper surface thereof.

Figure 50:
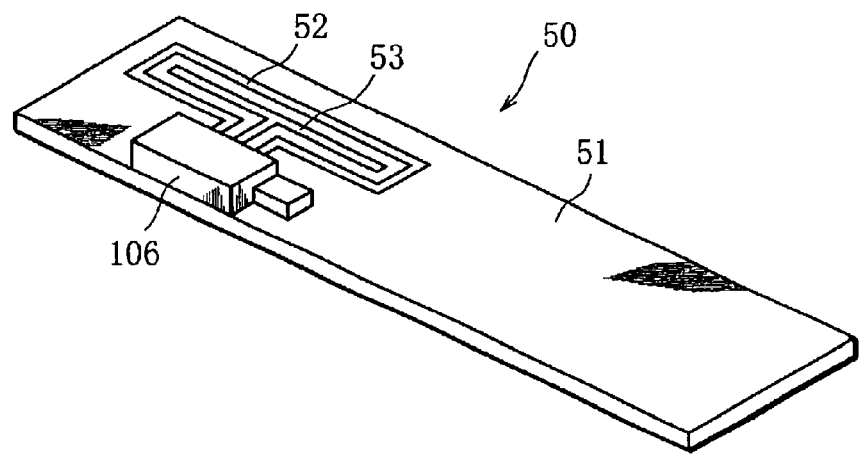
FIG. 50 is a perspective view for showing a variable resistor of the weight sensor device of the third embodiment.
Figure 51:
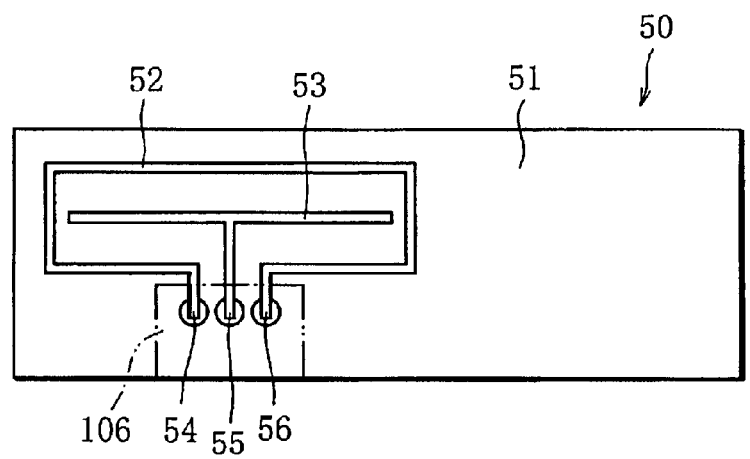
FIG. 51 is a plan view for showing a state of the variable resistor of FIG. 50 before a terminal cover is attached.

As shown in FIGS. 50 and 51, the insulation board 51 of the variable resistor 50 has a plurality of (two in the present embodiment) resistor strips 52 and 53. In the case of the present embodiment, for example, the resistor strip 52 is looped in a rectangle, while the resistor strip 53 is substantially T-shaped and arranged inside the resistor strip 52. That is, the resistor strip 52 goes around the resistor strip 53 in such a configuration that these resistor strips 52 and 53 extend in a longitudinal direction of the board 51 and have parts thereof arranged parallel to each other.

Both terminals 54 and 56 of the resistor strip 52 and a terminal 55 of the resistor strip 53 are connected to lead wires, respectively.

Furthermore, the board 51 is provided with a terminal cover 106 for covering the terminals 54, 55, and 56.

As shown in FIG. 44, the cover 402 has a notch 402c, through which the above-mentioned lead wires are introduced into the sensor unit 40 or the cover 402.

Figure 52:
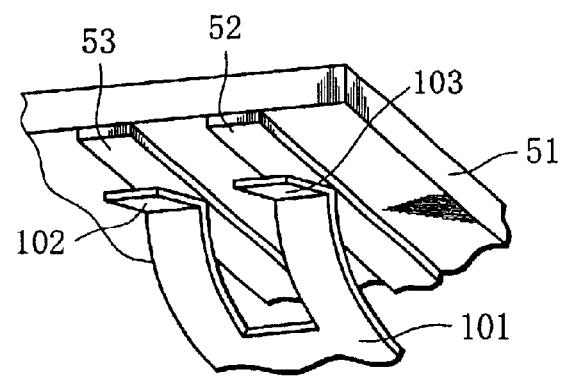
FIG. 52 is a perspective view for showing a state where the sliding element of the weight sensor device of FIG. 49 is in contact with resistor strips of the variable resistor.

As shown in FIG. 52, two legs 102 and 103 of the sliding element 101 are constantly kept in contact with the resistor strips 52 and 53 respectively.

Figure 53:
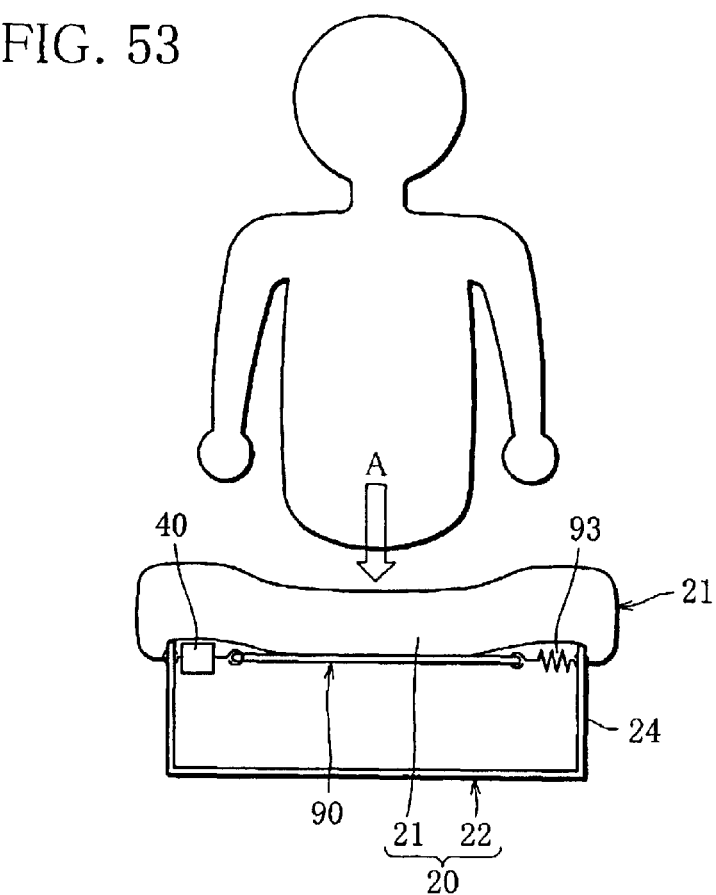
FIG. 53 is a cross-sectional front view for schematically showing the state where the occupant is seating on the seat cushion mounted with the weight sensor device of the third embodiment.
Figure 54:
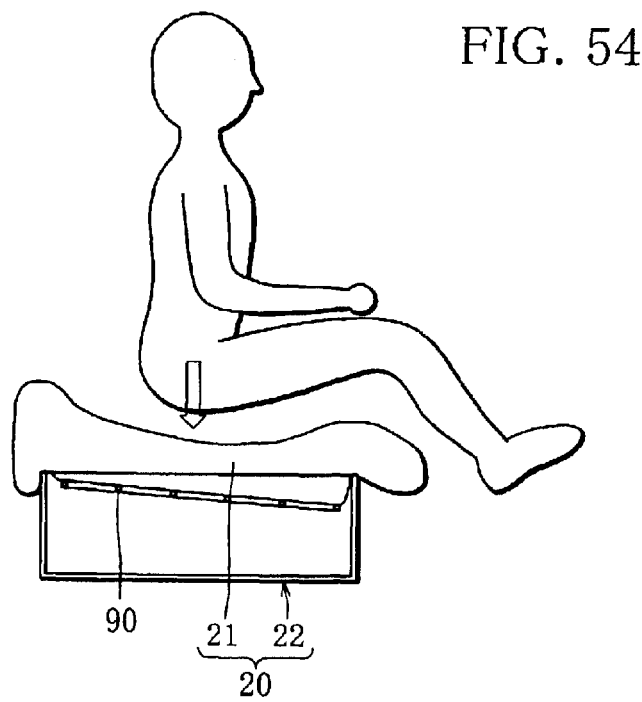
FIG. 54 is a cross-sectional side view for schematically showing the state where the occupant is seating on the seat cushion mounted with the weight sensor of the third embodiment.

As shown in FIGS. 53 and 54, when an occupant sits on the seat cushion 20, the occupant's weight is applied to the cushion 21 to displace the net 90 downward (in the arrow direction). As the net 90 is thus displaced downward, the slider 100 connected to the first hook member 31 through the rod 33 slides on the top face of the case 401. That is, a relative position between the slider 100 and the board 51 changes. A change in this relative position causes the legs 102 and 103 of the sliding element 101 to move on the resistor strips 52 and 53 respectively. This results in a change in output of the variable resistor 50.

In the weight sensor 30 according to the present embodiment, the deformation or displacement of the net 90 owing to a weight applied thereon is output from the variable resistor 50 as a change in voltage value, thus providing a simple and inexpensive control circuit which is not readily influenced by electromagnetic waves.

Figure 55:
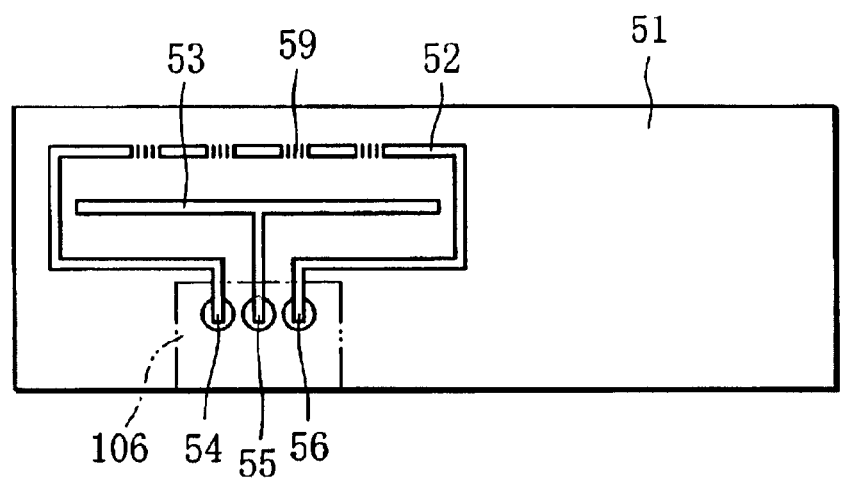
FIG. 55 is a plan view for showing a modification of the variable resistor of FIG. 51.
Figure 56:
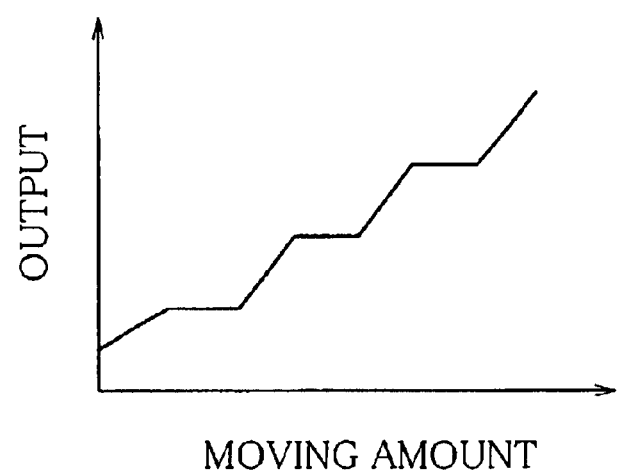
FIG. 56 is a graph for showing a relationship between the moving amount of the hook portion and an output of the weight sensor device with the resistor strips shown in FIG. 55.
Figure 57:
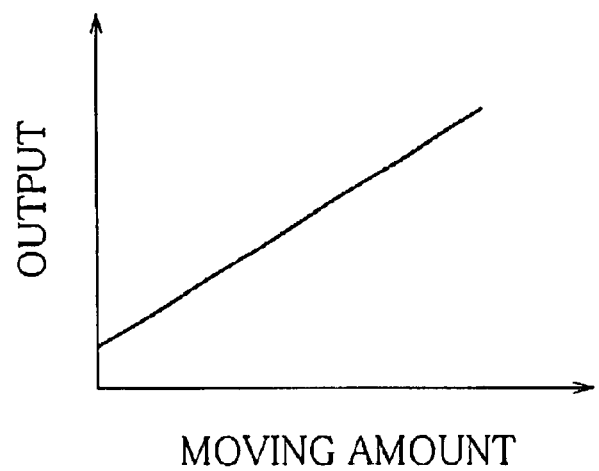
FIG. 57 is a graph for showing a relationship between the moving amount of the hook portion and an output of the weight sensor device with the resistor strips shown in FIG. 51.

As shown in FIG. 55, the insulation board 51 may further includes a conductive layers l 59 made of carbon or like, which conductive layers 59 are inserted as part of the resistor strip 52 or 53 or partially stacked on the strip. In this case, as shown in FIG. 56, the output of the variable resistor 50 changes stepwise as the moving amount of the first hook member 31 changes.

In contrast, in the case of such a variable resistor 50 having the resistor strips 52 and 53 as shown in FIG. 51, the output of the variable resistor 50 changes straightly as the moving amount of the first hook member 31 changes.

Figure 58:
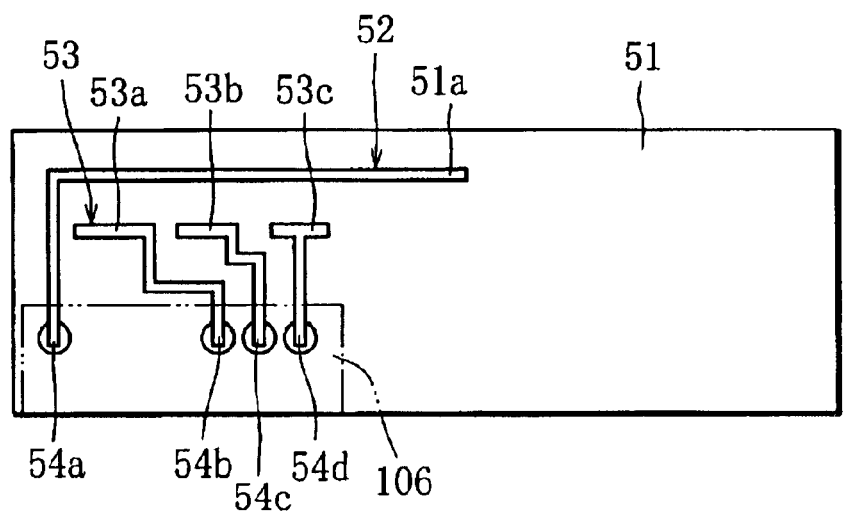
FIG. 58 is a plan view for showing a modification of the variable resistor of FIG. 51.

Furthermore, the resistor strips 52 and 53 may have such a pattern as shown in FIG. 58. In this case, the resistor strips 52 has the terminal 54 only at its one end, while the resistor strip 53 is divided into a plurality of resistor pieces 53a to 53c, which also have terminals 54b to 54d respectively. Furthermore, in this case, these resistor strips may each be made of a conductive material such as carbon in place of an electrical resistant material.

It is to be noted that the present invention is not limited to the above-mentioned embodiments but may be modified variously without departing from the scope thereof.

Figure 59:
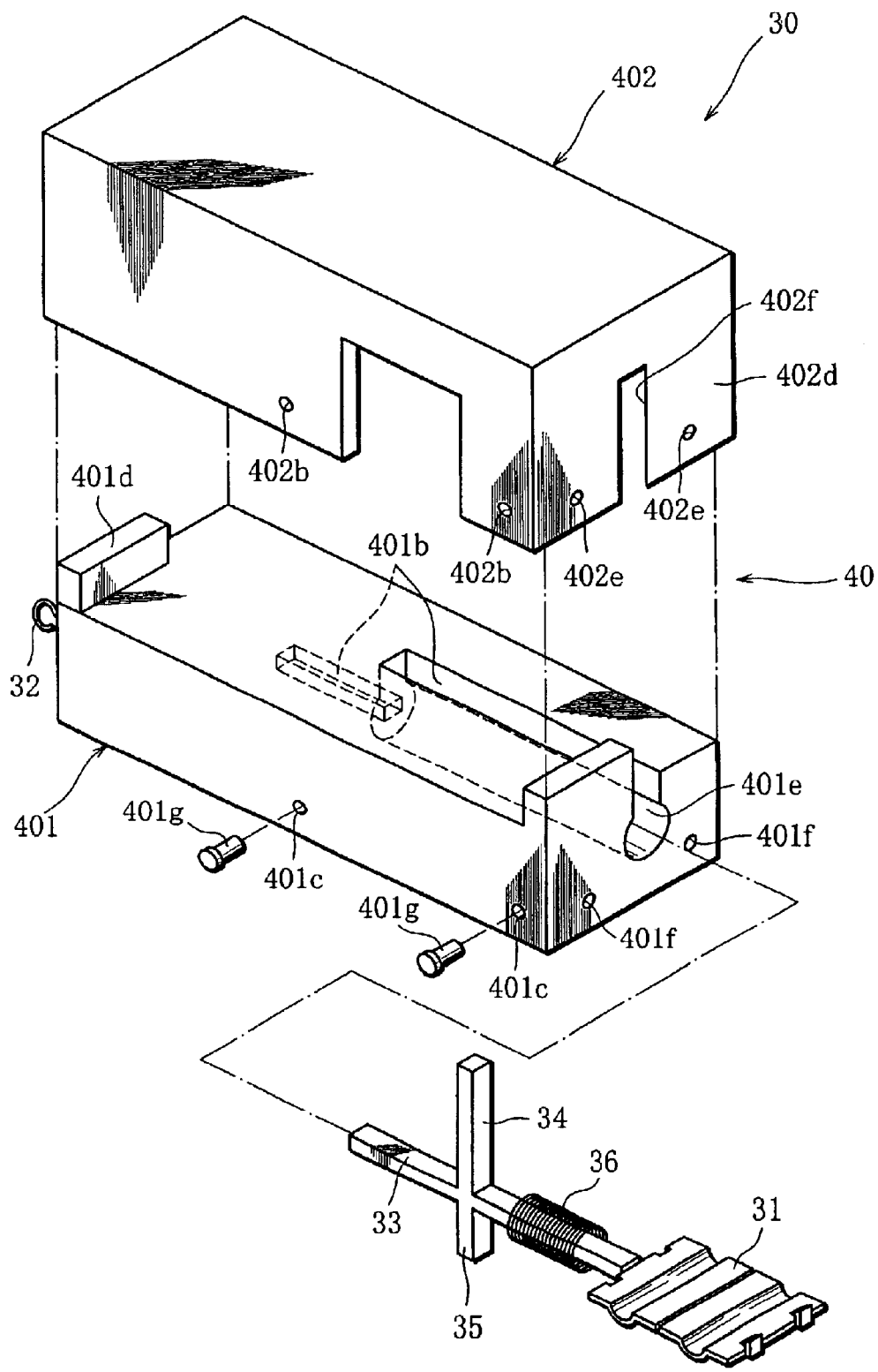
FIG. 59 is an exploded perspective view for showing a modification of the weight sensor device of FIG. 44.
Figure 60:
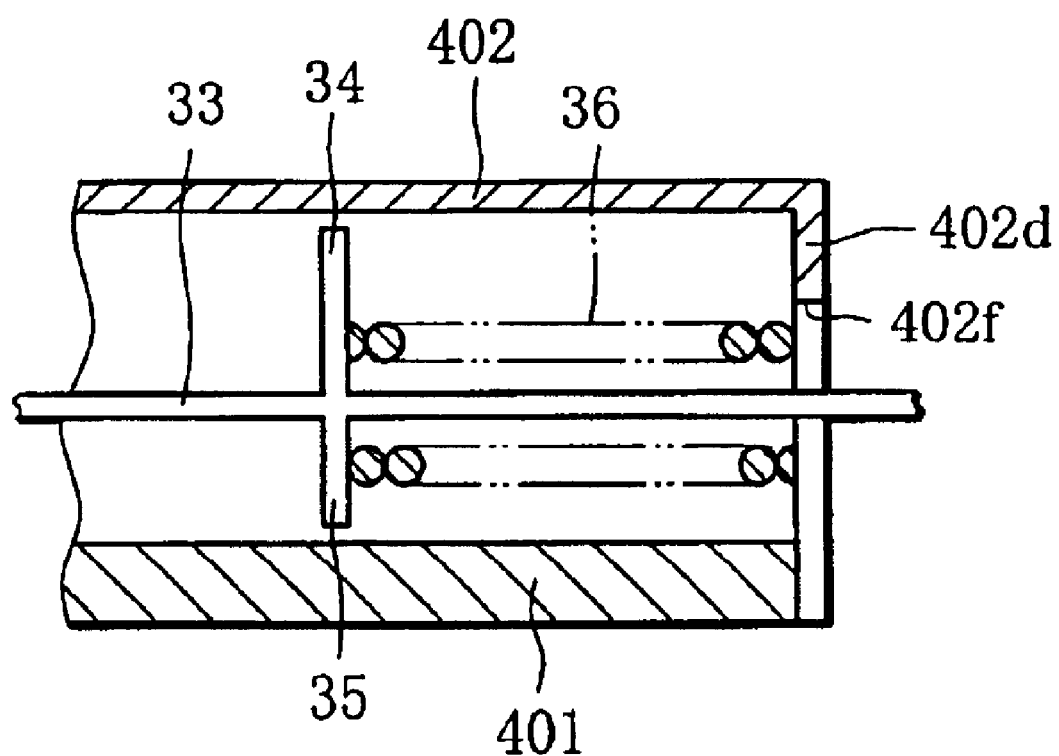
FIG. 60 is a cross-sectional view for showing a state where a coil spring shown in FIG. 59 is housed.

FIG. 59 is a perspective view for showing a modification of the weight sensor 30 of the third embodiment according to the present invention and FIG. 60 is a cross-sectional side view for showing a state where a coil spring 36 used in this weight sensor 30 is attached. It is to be noted that in both FIGS. 59 and 60, the insulation board 50, the slider 100, and the like are omitted for simplification.

This modification of the weight sensor 30 features that the coil spring (urging member) 36 is provided to the first hook member 31. Preferably the coil spring 36 has a larger inner diameter than the largest cross section of the first hook member 31. In the case 401 is formed such a spring chamber 401e for insertion of the coil spring 36. The spring chamber 401e extends along the groove 401b and surrounds part of the groove 401b. More specifically, the distal end portion of the rod 33 is slidably inserted into a hole portion of the groove 401b.

Furthermore, the first hook member 31 has such a rod portion 35 extending downward from the linkage portion 34. The rod portion 35 cooperates with the linkage portion 34 to form a spring seat for one end of the coil spring 36. Moreover, the cover 402 has a front end wall 402d as a spring seat for the other end of the coil spring 36. The front end wall 402d is fixed to the case 401 by bolts (not shown). Therefore, the case 401 and front end wall 402d has threaded holes 401f and through holes 402e for screwing the bolts, respectively. As shown in FIG. 60, the coil spring 36 is mounted between the spring seat of the first hook member 31 and the front end wall 402d of the cover 402 so as to absorb the shock applied on the first hook member 31 when an occupant is seated, thus stabilizing the sliding the first hook member 31.

What is claimed is:

1. A weight sensor device for detecting a weight of a occupant seated on a seat, the seat including a seat frame and a cushion, the cushion being deformed due to the weight of the occupant when the occupant is seated on said seat, said weight sensor device comprising:
    a displacement member arranged in the seat frame, said displacement member being displaced downward in the seat frame as the deformation of the cushion is caused;
    a converter for converting a displacement of said displacement member into an electric signal, the converter being connected to a side portion of the displacement member, wherein said converter comprises a moving member for moving in one direction in association with a displacement of said displacement member and a variable resistor mechanically connected to said moving member, said variable resistor having a resistance value changing in accordance with the movement of said moving member; and
    at least one spring member configured to produce resistance force with respect to the movement of the displacement member, the spring member being connected, independently of the connection between the converter and the displacement member, to the displacement member.

2. The weight sensor device according to claim 1, wherein said moving member rotates in association with a displacement of said displacement member.

3. The weight sensor device according to claim 1, wherein said moving member moves straightly in association with a displacement of said displacement member.

4. The weight sensor device according to claim 1, wherein said variable resistor includes:
    a board made of an electrically insulating material;
    a plurality of resistor strips formed on said board, each of said resistor strips having a portion extending in a movement direction of said moving member, and opposite ends thereof;
    a sliding element for moving along said resistor strops while keeping to electrical connection between said resistor strips as said moving member is moved; and
    terminals electrically connected to at least one ends of said resistor strips respectively.

5. The weight sensor device according to claim 4, wherein said resistor strip has a plurality of portions having a small electrical resistance arranged in a longitudinal direction of said resistor strip at intervals.

6. The weight sensor device according to claim 4, wherein one of said resistor strips is divided into a plurality of portions, each of said portions having a terminal.

7. The weight sensor device according to claim 1, wherein said displacement member includes a sensing wire located below the cushion, said sensing wire having one end fixed to the seat frame and the other end connected to said moving member, whereby said sensing wire is deformed in accordance with deformation of the cushion.

8. The weight sensor device according to claim 7, wherein said moving member includes a rotary wheel around which said sensing wire is wound.

9. A weight sensor device for detecting a weight of a occupant seated on a seat, the seat including a seat frame and a cushion, the cushion being deformed due to the weight of the occupant when the occupant is seated on said seat, said weight sensor device comprising:
    a displacement member arranged in the seat frame, said displacement member being displaced downward in the seat frame as the deformation of the cushion is caused; and
    a converter for converting a displacement of said displacement member into an electric signal, wherein said converter includes:
        a moving member for moving in one direction in association with a displacement of said displacement member; and
        a variable resistor mechanically connected to said moving member, said variable resistor having a resistance value changed in accordance with the movement of aid moving member,
    wherein said displacement member includes a sensing wire located below the cushion, said sensing wire having one end fixed to the seat frame and the other end connected to said moving member, whereby said sensing wire is deformed in accordance with deformation of the cushion, and
    wherein said displacement member includes first and second sensing wires intersecting with each other and a buffer member provided at an intersection of said first and second sensing wires.

10. A weight sensor device for detecting a weight of a occupant seated on a seat, the seat including a seat frame and a cushion, the cushion being deformed due to the weight of the occupant when the occupant is seated on said seat, said weight sensor device comprising:
    a displacement member arranged in the seat frame, said displacement member being displaced downward in the seat frame as the deformation of the cushion is caused; and
    a converter for converting a displacement of said displacement member into an electric signal, wherein said converter includes:
        a moving member for moving in one direction in association with a displacement of said displacement member; and
        a variable resistor mechanically connected to said moving member, said variable resistor having a resistance value changed in accordance with the movement of aid moving member, wherein said displacement member includes a net member located below the cushion and supported elastically with respect to the seat frame, said net member being displaced downward in accordance with deformation of the cushion.

11. The weight sensor device according to claim 10, wherein said moving member includes a hook member caught by said net member, said hook member rotating as said net member is displaced downward.

12. The weight sensor device according to claim 10, wherein said moving member includes a linkage rod having one end connected to said net member, said linkage rod moving straightly as said net member is displaced downward.

13. The weight sensor device according to claim 12, wherein said moving member further includes a spring member for producing resistance force with respect to the movement of said linkage rod.

14. The weight sensor device according to claim 10, wherein said moving member includes a wire having one end connected o said net member, said wire being displaced as said net member is displaced downward.

15. The weight sensor device according to claim 10, wherein said displacement member includes a spring member for supporting said net member, said spring member being displaced elastically as said net member is displaced.

* * * * *

UNITED STATES PATENT AND TRADEMARK OFFICE
CERTIFICATE OF CORRECTION

PATENT NO. : 6,849,808 B2
DATED : February 1, 2005
INVENTOR(S) : Enomoto et al.

It is certified that error appears in the above-identified patent and that said Letters Patent is hereby corrected as shown below:

Column 13,
Line 65, delete "strops" and insert -- strips --.

Column 14,
Line 1, delete "ends" and insert -- end --.

Column 16,
Line 7, after "connected" please delete "o" and insert -- to --.

Signed and Sealed this

Third Day of January, 2006

JON W. DUDAS
*Director of the United States Patent and Trademark Office*